United States Patent
Bates et al.

(10) Patent No.: US 9,977,647 B2
(45) Date of Patent: *May 22, 2018

(54) AUDIO CONTENT AUDITIONING BY PLAYBACK DEVICE

(71) Applicant: SONOS, INC., Santa Barbara, CA (US)

(72) Inventors: Paul Bates, Santa Barbara, CA (US); Abhishek Kumar, Santa Barbara, CA (US); Jonathan Lang, Santa Barbara, CA (US)

(73) Assignee: SONOS, INC., Santa Barbara, CA (US)

( * ) Notice: Subject to any disclaimer, the term of this patent is extended or adjusted under 35 U.S.C. 154(b) by 187 days.

This patent is subject to a terminal disclaimer.

(21) Appl. No.: 15/005,947

(22) Filed: Jan. 25, 2016

(65) Prior Publication Data

US 2016/0139873 A1    May 19, 2016

Related U.S. Application Data

(63) Continuation of application No. 14/506,352, filed on Oct. 3, 2014, now Pat. No. 9,304,735, which is a
(Continued)

(51) Int. Cl.
| | |
|---|---|
| *G06F 3/16* | (2006.01) |
| *G06F 3/0482* | (2013.01) |
| *G06F 9/50* | (2006.01) |
| *H04N 21/439* | (2011.01) |
| *H04N 21/81* | (2011.01) |
| *H04L 29/08* | (2006.01) |
| *H04N 21/458* | (2011.01) |
| *H04R 27/00* | (2006.01) |
| *H04N 21/436* | (2011.01) |
| *H04N 21/472* | (2011.01) |
| *G11B 20/10* | (2006.01) |

(52) U.S. Cl.
CPC ............ *G06F 3/165* (2013.01); *G06F 3/0482* (2013.01); *G06F 3/162* (2013.01); *G06F 9/5038* (2013.01);
(Continued)

(58) Field of Classification Search
CPC ........ G11B 27/102; G11B 2220/10972; G06F 3/165; G06F 17/3074; G06F 17/30749;
(Continued)

(56) References Cited

U.S. PATENT DOCUMENTS

| | | | |
|---|---|---|---|
| 5,440,644 A | 8/1995 | Farinelli et al. | |
| 5,761,320 A | 6/1998 | Farinelli et al. | |

(Continued)

FOREIGN PATENT DOCUMENTS

| | | |
|---|---|---|
| EP | 1389853 A1 | 2/2004 |
| JP | 2002344830 | 11/2002 |

(Continued)

OTHER PUBLICATIONS

"Sawhney et al., "Speaking and Listening on the Run: Design for Wearable Audio Computing", Wearable Computers 1998, 108-115."
(Continued)

*Primary Examiner* — Jesse A Elbin

(57) ABSTRACT

A first playback device plays first audio content in synchrony with at least one second playback device. One or more commands is received that define a duration of time. The first playback device stops playback of the first audio content based on the received one or more commands. After stopping playback of the first audio content, second audio content is played for the duration of time defined by the one or more commands. After playing the second audio content for the duration of time, the first playback device resumes playback of the first audio content in synchrony with the at least one second playback device.

20 Claims, 9 Drawing Sheets

Related U.S. Application Data continuation of application No. 13/478,946, filed on May 23, 2012, now Pat. No. 8,908,879.

(52) U.S. Cl.
CPC ......... *H04L 67/10* (2013.01); *H04N 21/4396* (2013.01); *H04N 21/43615* (2013.01); *H04N 21/458* (2013.01); *H04N 21/47217* (2013.01); *H04N 21/8106* (2013.01); *H04N 21/8113* (2013.01); *H04R 27/00* (2013.01); *G11B 2020/10972* (2013.01); *H04R 2227/005* (2013.01)

(58) Field of Classification Search
CPC ......... G06F 17/30769; G06F 17/30775; G06F 9/5038
USPC ......... 700/94; 381/119, 79, 80, 81; 715/716, 715/727; 709/231
See application file for complete search history.

(56) References Cited

U.S. PATENT DOCUMENTS

| | | | |
|---|---|---|---|
| 6,032,202 | A | 2/2000 | Lea et al. |
| 6,469,633 | B1 | 10/2002 | Wachter |
| 6,778,869 | B2 | 8/2004 | Champion |
| 7,295,548 | B2 | 11/2007 | Blank et al. |
| 7,483,538 | B2 | 1/2009 | McCarty et al. |
| 7,509,181 | B2 | 3/2009 | Champion |
| 7,571,014 | B1 | 8/2009 | Lambourne et al. |
| 7,630,501 | B2 | 12/2009 | Blank et al. |
| 7,643,894 | B2 | 1/2010 | Braithwaite et al. |
| 7,689,304 | B2 | 3/2010 | Sasaki |
| 7,853,341 | B2 | 12/2010 | McCarty et al. |
| 7,900,140 | B2 | 3/2011 | Mohammed et al. |
| 7,987,294 | B2 | 7/2011 | Bryce et al. |
| 8,045,952 | B2 | 10/2011 | Qureshey et al. |
| 8,055,364 | B2 | 11/2011 | Champion |
| 8,103,009 | B2 | 1/2012 | McCarty et al. |
| 8,111,132 | B2 | 2/2012 | Allen et al. |
| 8,148,622 | B2 | 4/2012 | Rothkopf et al. |
| 8,214,740 | B2 | 7/2012 | Johnson |
| 8,234,395 | B2 | 7/2012 | Millington et al. |
| 8,407,623 | B2 | 3/2013 | Kerr et al. |
| 8,483,853 | B1 | 7/2013 | Lambourne |
| 8,525,012 | B1 | 9/2013 | Yang |
| 8,843,586 | B2 | 9/2014 | Pantos et al. |
| 8,908,879 | B2 | 12/2014 | Bates et al. |
| 8,954,177 | B2 | 2/2015 | Sanders |
| 8,966,394 | B2 | 2/2015 | Gates et al. |
| 9,137,602 | B2 | 9/2015 | Mayman et al. |
| 9,176,962 | B2 | 11/2015 | Bachman et al. |
| 2002/0002039 | A1 | 1/2002 | Qureshey et al. |
| 2002/0002898 | A1 | 1/2002 | Schmitz et al. |
| 2002/0124097 | A1 | 9/2002 | Isely et al. |
| 2006/0218294 | A1 | 9/2006 | Rosenberg |
| 2007/0142944 | A1 | 6/2007 | Goldberg et al. |
| 2008/0104646 | A1 | 5/2008 | Kanda |
| 2008/0162716 | A1 | 7/2008 | Kayanuma et al. |
| 2009/0006695 | A1 | 1/2009 | Bushell et al. |
| 2009/0158198 | A1 | 6/2009 | Hayter et al. |
| 2009/0171487 | A1 | 7/2009 | Wilhelm |
| 2009/0222332 | A1 | 9/2009 | Smith et al. |
| 2009/0249222 | A1 | 10/2009 | Schmidt et al. |
| 2010/0229094 | A1 | 9/2010 | Nakajima et al. |
| 2010/0318911 | A1 | 12/2010 | Holladay et al. |
| 2011/0131520 | A1 | 6/2011 | Al-Shaykh et al. |
| 2011/0161006 | A1 | 6/2011 | Deurwaarder |
| 2011/0234480 | A1 | 9/2011 | Fino et al. |
| 2011/0301728 | A1 | 12/2011 | Hamilton et al. |
| 2012/0014233 | A1 | 1/2012 | Lee et al. |
| 2012/0029672 | A1 | 2/2012 | Hamilton et al. |
| 2013/0047084 | A1 | 2/2013 | Sanders et al. |
| 2013/0167029 | A1 | 6/2013 | Friesen et al. |
| 2014/0006483 | A1 | 1/2014 | Garmark et al. |
| 2014/0075308 | A1 | 3/2014 | Sanders et al. |
| 2014/0108929 | A1 | 4/2014 | Garmark et al. |
| 2014/0123005 | A1 | 5/2014 | Forstall et al. |
| 2014/0140530 | A1 | 5/2014 | Gomes-Casseres et al. |
| 2014/0378056 | A1 | 12/2014 | Liu |
| 2015/0026613 | A1 | 1/2015 | Kwon et al. |
| 2015/0074527 | A1 | 3/2015 | Sevigny et al. |
| 2015/0074528 | A1 | 3/2015 | Sakalowsky et al. |
| 2015/0256954 | A1 | 9/2015 | Carlsson et al. |

FOREIGN PATENT DOCUMENTS

| | | |
|---|---|---|
| JP | 2006287642 | 10/2006 |
| JP | 2006319869 | 11/2006 |
| JP | 2008113385 | 5/2008 |
| JP | 2008252205 | 10/2008 |
| JP | 2012053453 | 3/2012 |
| WO | 2003093950 A2 | 11/2003 |
| WO | 2014149533 A2 | 9/2014 |

OTHER PUBLICATIONS

"European Supplemental Search Report dated Jan. 5, 2016, issued in connection with European Application No. 13793580.5-1908, 8 pages."

Examiner-Initiated Interview Summary/First Action Interview Pilot Program Pre-Interview Communication dated Sep. 18, 2015, issued in connection with U.S. Appl. No. 14/506,352, filed Oct. 3, 2014, 5 pages.

First Action Interview Office Action dated Feb. 2, 2016, issued in connection with U.S. Appl. No. 14/633,304, filed Feb. 27, 2015, 10 pages.

First Action Interview Office Action dated Jan. 22, 2016, issued in connection with U.S. Appl. No. 14/682,887, filed Apr. 9, 2015, 8 pages.

First Action Interview Pilot Program Pre-Interview Communication dated Oct. 5, 2015, issued in connection with U.S. Appl. No. 14/682,887, filed Apr. 9, 2015, 6 pages.

"First Action Interview Pilot Program Pre-Interview Communication dated Oct. 23, 2015, issued in connection with U.S. Appl. No. 14/633,304, filed Feb. 27, 2015, 5 pages."

International Bureau, International Preliminary Report on Patentability, dated Dec. 4, 2014, issued in connection with International Application No. PCT/US2013/042255, filed on May 22, 2013, 9 pages.

International Searching Authority, International Search Report dated Aug. 27, 2013, issued in connection with International Application No. PCT/US2013/042255, 5 pages.

International Searching Authority, Written Opinion dated Aug. 27, 2013, issued in connection with International Application No. PCT/US2013/042255, filed May 22, 2013, 9 pages.

"Japanese Intellectual Property Office, Office Action Summary dated Jan. 5, 2016, issued in connection with Japanese Patent Application No. 2015-514157, 11 pages."

Non-Final Office Action dated Apr. 28, 2014, issued in connection with U.S. Appl. No. 13/478,946, filed May 23, 2012, 14 pages.

"Notice of Allowance dated Dec. 4, 2015, issued in connection with U.S. Appl. No. 14/506,352, filed Oct. 3, 2014, 12 pages."

Notice of Allowance dated Sep. 15, 2014, issued in connection with U.S. Appl. No. 13/478,946, filed May 23, 2012, 7 pages.

Supplemental Notice of Allowability dated Jan. 14, 2016, issued in connection with U.S. Appl. No. 14/506,352, filed Oct. 3, 2014, 6 pages.

Chinese Patent Office, Chinese Office Action dated Jun. 1, 2016, issued in connection with Chinese Patent Application No. 201380038653.2, 24 pages.

Notice of Allowance dated Jun. 2, 2016, issued in connection with U.S. Appl. No. 14/633,304, filed Feb. 27, 2015, 8 pages.

Notice of Allowance dated Jun. 2, 2016, issued in connection with U.S. Appl. No. 14/682,887, filed Apr. 9, 2015, 8 pages.

Japanese Intellectual Property Office, Office Action Summary dated Sep. 6, 2016, issued in connection with Japanese Patent Application No. 2015-514157, 4 pages.

(56) References Cited

OTHER PUBLICATIONS

Audio-Iron Quick Start Guide, Version 1.0.
AudioTron Reference Manual, Version 3.0.
AudioTron Setup Guide, Version 3.0.
Jo et al., "Synchronized One-to-many Media Streaming with Adaptive Playout Control;" Proceedings of SPIE, 2002, pp. 71-82, vol. 4861.
"Denon 2003-2004 Product Catalog," Denon, 2003-2004, 44 pages.
U.S. Appl No. 60/490,768, filed Jul. 28, 2003, entitled "Method for synchronizing audio playback between multiple networked devices," 13 pages.
U.S. Appl. No. 60/825,407, filed Sep. 12, 2003, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.
Chinese Patent Office, Second Office Action dated Jun. 1, 2016, issued in connection with Chinese Patent Application No. 201380038653.2, 17 pages.
Chinese Patent Office, Third Office Action dated Aug. 14, 2017, issued in connection with Chinese Application No. 201380038653.2, 12 pages.

AUDIO CONTENT AUDITIONING BY PLAYBACK DEVICE

CROSS-REFERENCE TO RELATED APPLICATIONS

This application claims priority under 35 U.S.C. § 120 to, and is a continuation of, U.S. Non-provisional patent application Ser. No. 14/506,352, filed on Oct. 3, 2014, entitled "Audio Content Auditioning by Playback Device", which is a continuation of Application Ser. No. 13/478,946 filed May 23, 2012 (now U.S. Pat. No. 8,908,879), the contents of each of which is hereby incorporated by reference in its entirety for all purposes.

FIELD OF THE DISCLOSURE

The disclosure is related to consumer goods and, more particularly, to systems, products, features, services, and other items directed to media playback or some aspect thereof.

BACKGROUND

Technological advancements have increased the accessibility of music content, as well as other types of media, such as television content, movies, and interactive content. For example, a user can access audio, video, or both audio and video content over the internet through an online store, an internet radio station, a music service, a movie service, and so on, in addition to the more traditional avenues of accessing audio and video content. Demand for audio, video, and both audio and video content inside and outside of the home continues to increase.

BRIEF DESCRIPTION OF THE DRAWINGS

Features, aspects, and advantages of the presently disclosed technology are better understood with regard to the following description, appended claims, and accompanying drawings where:

Figure 1:
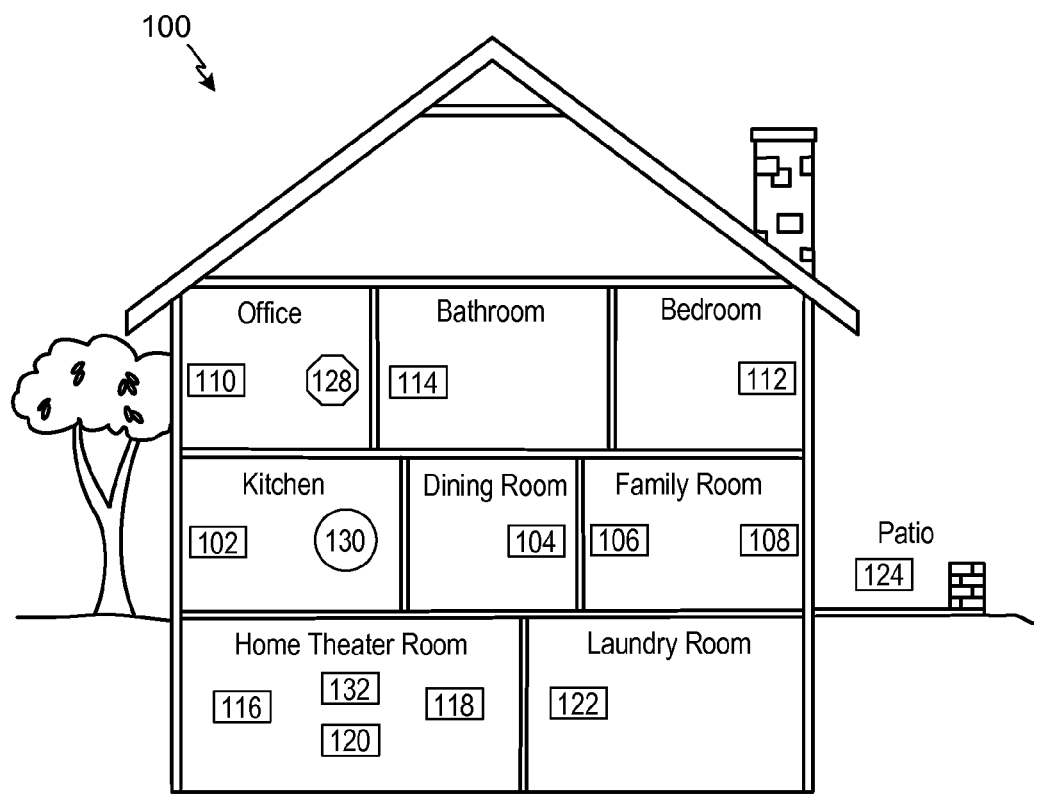
FIG. 1 shows an illustration of an example system in which embodiments of the methods and apparatus disclosed herein can be implemented.

In addition, the drawings are for the purpose of illustrating example embodiments, but it is understood that the present disclosure is not limited to the arrangements and instrumentality shown in the drawings.

DETAILED DESCRIPTION

I. Overview

Listening to audio content (e.g., music, talk radio, books, the audio from television, etc.) out loud may be a social activity that involves family, friends, or both. For example, in a household, people may play music out loud at parties and other social gatherings. In such an environment, people may wish to play the music in multiple listening zones simultaneously, such that the music in each listening zone may be synchronized, without audible echoes or glitches. Such an experience may be further enriched when people may browse audio sources, add a music track to a playback queue, learn more about a music track (such as track title or track artists), or view what music track is next in the playback queue. Listening to audio content out loud may also be an individual experience. For example, an individual may play music out loud for themselves in the morning before work, in the evening during dinner, or at other times throughout the day at home, work, or on the road. For these individual experiences, the individual may choose to either use headphones, or limit the out loud playback of audio content to a single zone or area.

For some people, discovery may also be an important element of the audio experience. In some cases, discovery may involve friends telling each other about their latest favorite new song or artist. In some other cases, discovery may also involve browsing music magazines and periodicals that regularly review the latest releases. In addition, some online music services, radio stations, and disc jockeys are also means for people to share and discover new music.

In the present application, systems and methods are provided to offer a unique wired, wireless, or both wired and wireless audio solution that allows audio content to be played in a single listening zone or across multiple listening zones simultaneously and in synchrony. The audio content may be played out loud or using headphones. In an example, such a system may include audio players, often referred to as zone players or players, and controllers, which may also be a player. The controllers may be used to control the system, and may include capabilities for browsing and selecting audio content for playback, viewing and editing audio content in one or more playback queues, or grouping and ungrouping zone players into one or more listening zones, etc. In a sense, the system may operate as a distributed system such that each controller has full control over the entire system, and each player has the ability to play audio content from the either a same audio source or a different audio source as another player.

The system may further be configured to operate in an "audition mode" such that a user may preview tracks or songs, radio stations, and streaming content. In one example, a method is provided that comprises providing a first audio content to be rendered by a first group of one or more playback devices, receiving input data indicating a request for a second audio content to be played for a duration of time by at least one playback device from the first group of one or more playback devices, suspending rendering of the first audio content by the at least one playback device, providing the second audio content to be rendered by the at least one playback device for the duration of time, and resuming rendering of the first audio content by the at least one playback device.

In another example, a device is provided. The device includes a processor and memory. The memory includes instructions stored therein executable by the processor to perform functions. The performed functions comprise providing a first audio content to be rendered by a first group of one or more playback devices, receiving input data indicating a request for a second audio content to be played for a duration of time by at least one playback device from the first group of one or more playback devices, suspending rendering of the first audio content by the at least one playback device, providing the second audio content to be rendered by the at least one playback device for the duration of time, and resuming rendering of the first audio content by the at least one playback device.

In yet another example, a system is provided. The system includes one or more audio content sources, one or more audio playback devices, a controller, and a processing unit in communication with the audio content source, the one or more audio playback device, and the controller. The processing unit is configured to cause a first group of one or more playback devices to render a first audio content from the one or more audio content sources. The processing unit is further configured to receive from the controller input data indicating a request for a second audio content from the one or more audio content sources to be played for a duration of time by at least one playback device from the first group of one or more playback devices, cause one or more of the playback devices from the first group of one or more playback devices to suspend rendering of the first audio content, cause the at least one playback device to render the second audio content for the duration of time, and cause the one or more of the playback devices from the first group of one or more playback devices to resume rendering of the first audio content.

With audition mode implemented on the system, as described above, a user may have the option, while audio is playing from a group of zone players, to select a music track or audio stream to preview on one or more zone players from the group of zone players. Additionally, a user may have the option, while audio is playing from a zone player or group of zone players, to select a music track or audio stream to preview on a second zone group consisting of at least one zone player from the first zone group and at least one zone player that is not included in the first zone group. In other words, the second zone group in this case may be temporarily established for the duration of audition mode. Seamless transitions when entering or exiting audition mode further allows the user to preview the music track or audio stream with minimal interruption to the music that may have been already playing.

II. An Example Operating Environment

Referring now to the drawings, in which like numerals can refer to like parts throughout the figures, FIG. 1 shows an example system 100 in which one or more embodiments disclosed herein can be practiced or implemented.

By way of illustration, system 100 represents a home presently configured with multiple zones, though the home could have been configured with only one zone. Each zone in the home, for example, may represent a different room or space, such as an office, bathroom, bedroom, kitchen, dining room, family room, home theater room, utility or laundry room, and patio. A single zone might also include multiple rooms if so configured. One or more of zone players 102-124 are shown in each respective zone of the home. A zone player 102-124, also referred to as a playback device, multimedia unit, speaker, player, and so on, provides audio, video, and/or audiovisual output. Controller 130 provides control to system 100. Controller 130 may be fixed to a zone, or alternatively, mobile such that it can be moved about the zones. System 100 may also include more than one controller 130. System 100 illustrates an example whole house audio system, though it is understood that the technology described herein is not limited to its particular place of application or to an expansive system like a whole house audio system 100 of FIG. 1.

A. Example Zone Players

Figure 2A:
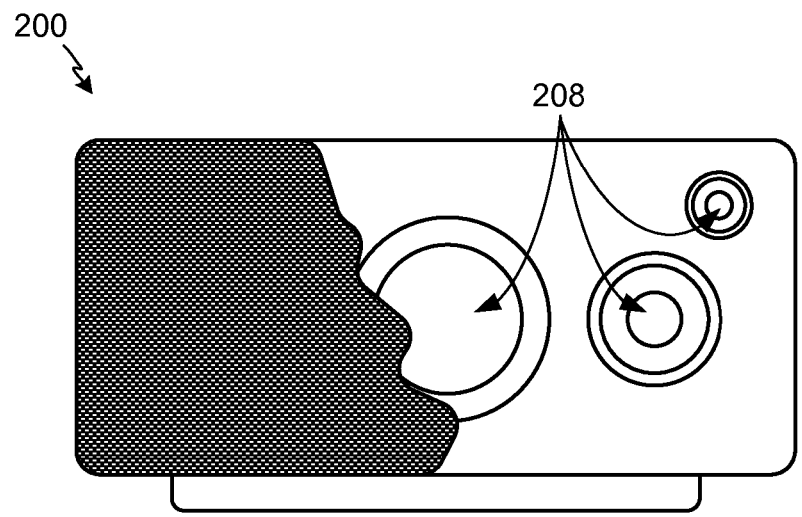
FIG. 2A shows an illustration of an example zone player having a built-in amplifier and speakers.
Figure 2B:
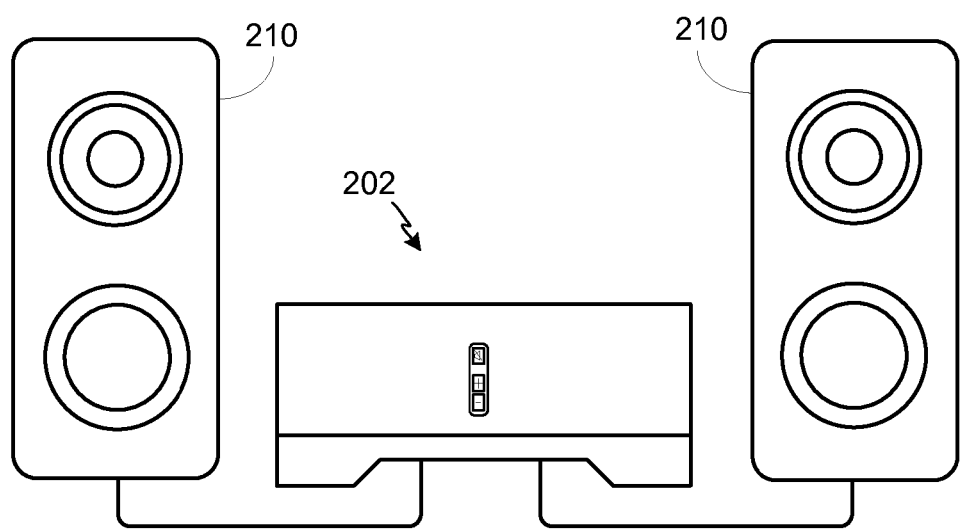
FIG. 2B shows an illustration of an example zone player having a built-in amplifier and connected to external speakers.
Figure 2C:
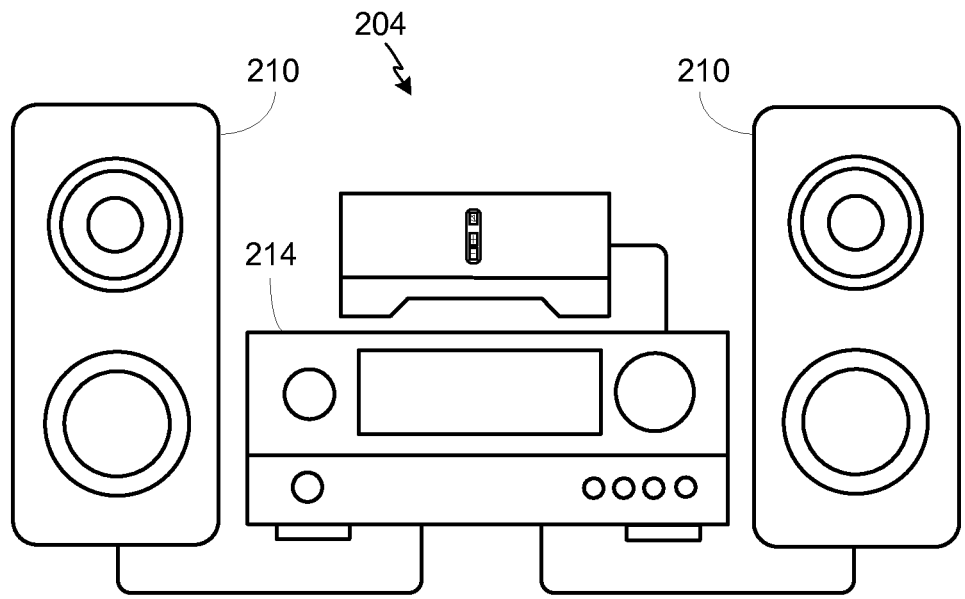
FIG. 2C shows an illustration of an example zone player connected to an A/V receiver and speakers.

FIGS. 2A, 2B, and 2C show example types of zone players. Zone players 200, 202, and 204 of FIGS. 2A, 2B, and 2C, respectively, can correspond to any of the zone players 102-124 of FIG. 1, for example. In some embodiments, audio is reproduced using only a single zone player, such as by a full-range player. In some embodiments, audio is reproduced using two or more zone players, such as by using a combination of full-range players or a combination of full-range and specialized players. In some embodiments, zone players 200-204 may also be referred to as a "smart speaker," because they contain processing capabilities beyond the reproduction of audio, more of which is described below.

FIG. 2A illustrates zone player 200 that includes sound producing equipment 208 capable of reproducing full-range sound. The sound may come from an audio signal that is received and processed by zone player 200 over a wired or wireless data network. Sound producing equipment 208 includes one or more built-in amplifiers and one or more speakers. A built-in amplifier is described more below with respect to FIG. 4. A speaker or acoustic transducer might include, for example, any of a tweeter, a mid-range driver, a low-range driver, and a subwoofer. In some embodiments, zone player 200 can be statically or dynamically configured to play stereophonic audio, monaural audio, or both. In some embodiments, zone player 200 is configured to reproduce a subset of full-range sound, such as when zone player 200 is grouped with other zone players to play stereophonic audio, monaural audio, and/or surround audio or when the audio content received by zone player 200 is less than full-range.

FIG. 2B illustrates zone player 202 that includes a built-in amplifier to power a set of detached speakers 210. A detached speaker can include, for example, any type of loudspeaker. Zone player 202 may be configured to power one, two, or more separate loudspeakers. Zone player 202 may be configured to communicate an audio signal (e.g., right and left channel audio or more channels depending on its configuration) to the detached speakers 210 via a wired path.

FIG. 2C illustrates zone player 204 that does not include a built-in amplifier, but is configured to communicate an audio signal, received over a data network, to an audio (or "audio/video") receiver 214 with built-in amplification.

Referring back to FIG. 1, in some embodiments, one, some, or all of the zone players 102 to 124 can retrieve audio directly from a source. For example, a zone player may contain a playlist or queue of audio items to be played. Each item in the queue may comprise a uniform resource identifier (URI) or some other identifier. The URI or identifier can point the zone player to the audio source. The source might be found on the internet (e.g., the cloud), locally from another device over data network 128, the controller 130, stored on the zone player itself, or from an audio source communicating directly to the zone player. In some embodiments, the zone player can reproduce the audio itself, send it to another zone player for reproduction, or both where the audio is played by the zone player and one or more additional zone players in synchrony. In some embodiments, the zone player can play a first audio content (or not play at all), while sending a second, different audio content to another zone player(s) for reproduction.

By way of illustration, SONOS, Inc. of Santa Barbara, California presently offers for sale zone players referred to as a "PLAY:5," "PLAY:3," "CONNECT:AMP," "CONNECT," and "SUB." Any other past, present, and/or future zone players can additionally or alternatively be used to implement the zone players of example embodiments disclosed herein. Additionally, it is understood that a zone player is not limited to the particular examples illustrated in FIGS. 2A, 2B, and 2C or to the SONOS product offerings. For example, a zone player might consist of a wired or wireless headphone. In yet another example, a zone player might include a sound bar for television. In yet another example, a zone player can include or interact with a docking station for an Apple iPod™ or similar device.

B. Example Controllers

Figure 3:
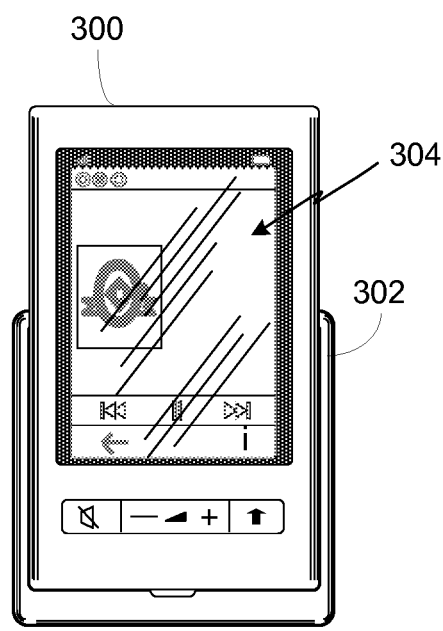
FIG. 3 shows an illustration of an example controller.

FIG. 3 illustrates an example wireless controller 300 in docking station 302. By way of illustration, controller 300 can correspond to controlling device 130 of FIG. 1. Docking station 302, if provided, may be used to charge a battery of controller 300. In some embodiments, controller 300 is provided with a touch screen 304 that allows a user to interact through touch with the controller 300, for example, to retrieve and navigate a playlist of audio items, control operations of one or more zone players, and provide overall control of the system configuration 100. In certain embodiments, any number of controllers can be used to control the system configuration 100. In some embodiments, there can be a limit set on the number of controllers that can control the system configuration 100. The controllers might be wireless like wireless controller 300 or wired to data network 128.

In some embodiments, if more than one controller is used in system 100, then each controller may be coordinated to display common content, and may all be dynamically updated to indicate changes made from a single controller. Coordination might happen, for instance, by a controller periodically requesting a state variable directly or indirectly from one or more zone players; the state variable may provide information about system 100, such as current zone group configuration, what is playing in one or more zones, volume levels, and other items of interest. The state variable may be passed around on data network 128 between zone players (and controllers, if so desired) as needed or as often as programmed.

In addition, an application running on any network-enabled portable device, such as an iPhone™, iPad™, Android™ powered phone, or any other smart phone or network-enabled device can be used as controller 130. An application running on a laptop or desktop PC or Mac can also be used as controller 130. Such controllers may connect to system 100 through an interface with data network 128, a zone player, a wireless router, or using some other configured connection path. Example controllers offered by SONOS, Inc. of Santa Barbara, Calif. include a "Controller 200," "Sonos CONTROL," "Sonos® Controller for iPhone," "Sonos® Controller for iPad," "Sonos® Controller for Android, "Sonos® Controller for Mac or PC."

C. Example Data Connection

Zone players 102 to 124 of FIG. 1 are coupled directly or indirectly to a data network, such as data network 128. Controller 130 may also be coupled directly or indirectly to data network 128 or individual zone players. Data network 128 is represented by an octagon in the figure to stand out from other representative components. While data network 128 is shown in a single location, it is understood that such a network is distributed in and around system 100. Particularly, data network 128 can be a wired network, a wireless network, or a combination of both wired and wireless networks. In some embodiments, one or more of the zone players 102-124 are wirelessly coupled to data network 128 based on a proprietary mesh network. In some embodiments, one or more of the zone players 102-124 are wirelessly coupled to data network 128 using a non-mesh topology. In some embodiments, one or more of the zone players 102-124 are coupled via a wire to data network 128 using Ethernet or similar technology. In addition to the one or more zone players 102-124 connecting to data network 128, data network 128 can further allow access to a wide area network, such as the internet.

In some embodiments, connecting any of the zone players 102-124, or some other connecting device, to a broadband router, can create data network 128. Other zone players 102-124 can then be added wired or wirelessly to the data network 128. For example, a zone player (e.g., any of zone players 102-124) can be added to the system configuration 100 by simply pressing a button on the zone player itself (or perform some other action), which enables a connection to be made to data network 128. The broadband router can be connected to an Internet Service Provider (ISP), for example. The broadband router can be used to form another data network within the system configuration 100, which can be used in other applications (e.g., web surfing). Data network 128 can also be used in other applications, if so programmed. An example, second network may implement SonosNet protocol, developed by SONOS, Inc. of Santa Barbara. SonosNet represents a secure, AES-encrypted, peer-to-peer wireless mesh network. Alternatively, in certain embodiments, the data network 128 is the same network, such as a traditional wired or wireless network, used for other applications in the household.

D. Example Zone Configurations

A particular zone can contain one or more zone players. For example, the family room of FIG. 1 contains two zone players 106 and 108, while the kitchen is shown with one zone player 102. In another example, the home theater room contains additional zone players to play audio from a 5.1 channel or greater audio source (e.g., a movie encoded with 5.1 or greater audio channels). In some embodiments, one can position a zone player in a room or space and assign the zone player to a new or existing zone via controller 130. As such, zones may be created, combined with another zone, removed, and given a specific name (e.g., "Kitchen"), if so desired and programmed to do so with controller 130. Moreover, in some embodiments, zone configurations may be dynamically changed even after being configured using controller 130 or some other mechanism.

In some embodiments, if a zone contains two or more zone players, such as the two zone players 106 and 108 in the family room, then the two zone players 106 and 108 can be configured to play the same audio source in synchrony, or the two zone players 106 and 108 can be paired to play two separate sounds in left and right channels, for example. In other words, the stereo effects of a sound can be reproduced or enhanced through the two zone players 106 and 108, one for the left sound and the other for the right sound. In certain embodiments, paired zone players (also referred to as "bonded zone players") can play audio in synchrony with other zone players in the same or different zones.

In some embodiments, two or more zone players can be sonically consolidated to form a single, consolidated zone player. A consolidated zone player (though made up of multiple, separate devices) can be configured to process and reproduce sound differently than an unconsolidated zone player or zone players that are paired, because a consolidated zone player will have additional speaker drivers from which sound can be passed. The consolidated zone player can further be paired with a single zone player or yet another consolidated zone player. Each playback device of a consolidated playback device is preferably set in a consolidated mode.

According to some embodiments, one can continue to do any of: group, consolidate, and pair zone players, for example, until a desired configuration is complete. The actions of grouping, consolidation, and pairing are preferably performed through a control interface, such as using controller 130, and not by physically connecting and reconnecting speaker wire, for example, to individual, discrete speakers to create different configurations. As such, certain embodiments described herein provide a more flexible and dynamic platform through which sound reproduction can be offered to the end-user.

E. Example Audio Sources

In some embodiments, each zone can play from the same audio source as another zone or each zone can play from a different audio source. For example, someone can be grilling on the patio and listening to jazz music via zone player 124, while someone is preparing food in the kitchen and listening to classical music via zone player 102. Further, someone can be in the office listening to the same jazz music via zone player 110 that is playing on the patio via zone player 124. In some embodiments, the jazz music played via zone players 110 and 124 is played in synchrony. Synchronizing playback amongst zones allows for someone to pass through zones while seamlessly (or substantially seamlessly) listening to the audio. Further, zones can be put into a "party mode" such that all associated zones will play audio in synchrony.

Sources of audio content to be played by zone players 102-124 are numerous. In some embodiments, music on a zone player itself may be accessed and a played. In some embodiments, music from a personal library stored on a computer or networked-attached storage (NAS) may be accessed via the data network 128 and played. In some embodiments, internet radio stations, shows, and podcasts can be accessed via the data network 128. Music or cloud services that let a user stream and/or download music and audio content can be accessed via the data network 128. Further, music can be obtained from traditional sources, such as a microphone, a turntable or CD player, via a line-in connection to a zone player, for example. Audio content can also be accessed using a different protocol, such as AirPlay™, which is a wireless technology by Apple, Inc., for example. Audio content received from one or more sources can be shared amongst the zone players 102 to 124 via data network 128 and/or controller 130. The above-disclosed sources of audio content are referred to herein as network-based audio information sources. However, network-based audio information sources are not limited thereto.

In some embodiments, the example home theater zone players 116, 118, 120 are coupled to an audio information source such as a television 132. In some examples, the television 132 is used as a source of audio for the home theater zone players 116, 118, 120, while in other examples audio information from the television 132 can be shared with any of the zone players 102-124 in the audio system 100.

III. Zone Players

Figure 4:
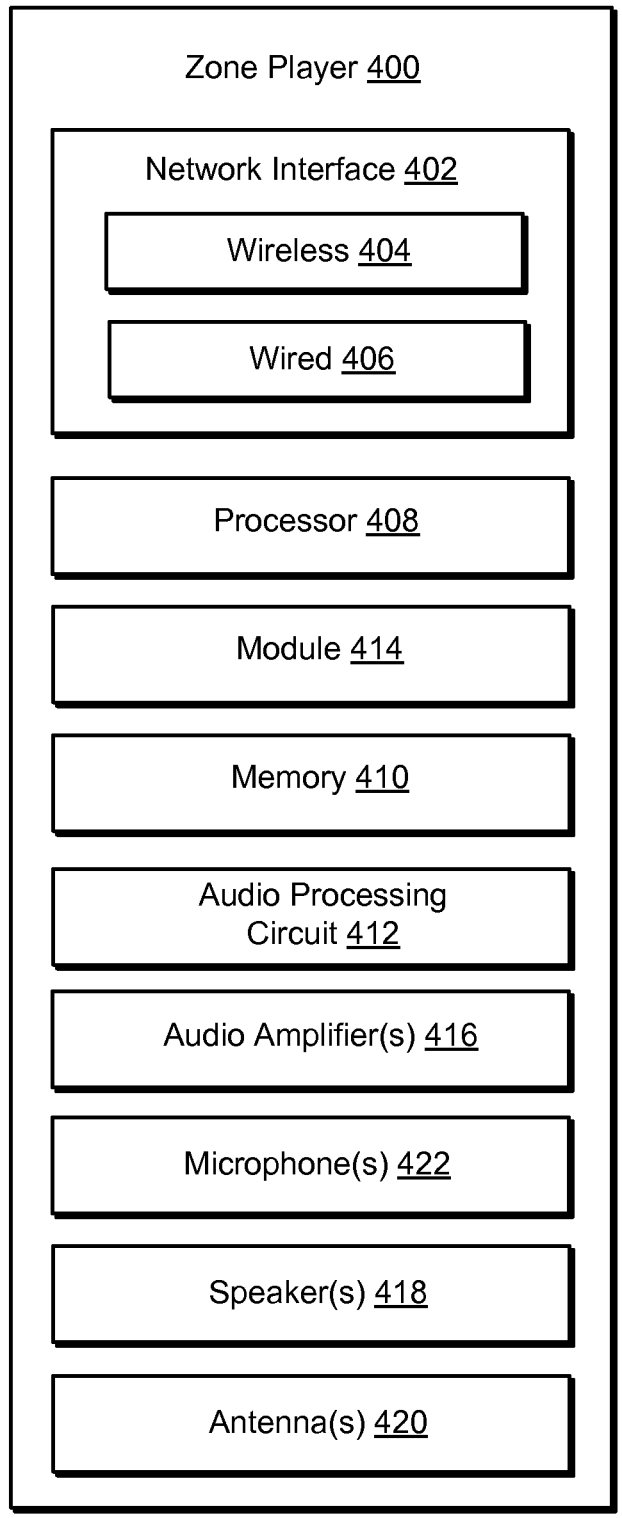
FIG. 4 shows an internal functional block diagram of an example zone player.

Referring now to FIG. 4, there is shown an example block diagram of a zone player 400 in accordance with an embodiment. Zone player 400 includes a network interface 402, a processor 408, a memory 410, an audio processing component 412, one or more modules 414, an audio amplifier 416, a microphone 422, and a speaker unit 418 coupled to the audio amplifier 416. FIG. 2A shows an example illustration of such a zone player. Other types of zone players may not include the speaker unit 418 (e.g., such as shown in FIG. 2B) or the audio amplifier 416 (e.g., such as shown in FIG. 2C). Further, it is contemplated that the zone player 400 can be integrated into another component. For example, the zone player 400 could be constructed as part of a television, lighting, or some other device for indoor or outdoor use.

In some embodiments, network interface 402 facilitates a data flow between zone player 400 and other devices on a data network 128. In some embodiments, in addition to getting audio from another zone player or device on data network 128, zone player 400 may access audio directly from the audio source, such as over a wide area network or on the local network. In some embodiments, the network interface 402 can further handle the address part of each packet so that it gets to the right destination or intercepts packets destined for the zone player 400. Accordingly, in certain embodiments, each of the packets includes an Internet Protocol (IP)-based source address as well as an IP-based destination address.

In some embodiments, network interface 402 can include one or both of a wireless interface 404 and a wired interface 406. The wireless interface 404, also referred to as an RF interface, provides network interface functions for the zone player 400 to wirelessly communicate with other devices (e.g., other zone player(s), speaker(s), receiver(s), component(s) associated with the data network 128, and so on) in accordance with a communication protocol (e.g., any of the wireless standards IEEE 802.11a, 802.11b, 802.11g, 802.11n, or 802.15). Wireless interface 404 may include one or more radios. To receive wireless signals and to provide the wireless signals to the wireless interface 404 and to transmit wireless signals, the zone player 400 includes one or more antennas 420. The wired interface 406 provides network interface functions for the zone player 400 to communicate over a wire with other devices in accordance with a communication protocol (e.g., IEEE 802.3). In some embodiments, a zone player includes both of the interfaces 404 and 406. In some embodiments, a zone player 400 includes only the wireless interface 404 or the wired interface 406.

In some embodiments, the processor 408 is a clock-driven electronic device that is configured to process input data according to instructions stored in memory 410. The memory 410 is data storage that can be loaded with one or more software module(s) 414, which can be executed by the processor 408 to achieve certain tasks. In the illustrated embodiment, the memory 410 is a tangible machine-readable medium storing instructions that can be executed by the processor 408. In some embodiments, a task might be for the zone player 400 to retrieve audio data from another zone player or a device on a network (e.g., using a URL or some other identifier). In some embodiments, a task might be for the zone player 400 to send audio data to another zone player or device on a network. In some embodiments, a task might be for the zone player 400 to synchronize playback of audio with one or more additional zone players. In some embodiments, a task might be to pair the zone player 400 with one or more zone players to create a multi-channel audio environment. Additional or alternative tasks can be achieved via the one or more software module(s) 414 and the processor 408.

The audio processing component 412 can include one or more digital-to-analog converters (DAC), an audio preprocessing component, an audio enhancement component or a digital signal processor, and so on. In some embodiments, the audio processing component 412 may be part of processor 408. In some embodiments, the audio that is retrieved via the network interface 402 or the microphone 422 is processed and/or intentionally altered by the audio processing component 412. Further, the audio processing component 412 can produce analog audio signals. The processed analog audio signals are then provided to the audio amplifier 416 for play back through speakers 418. In addition, the audio processing component 412 can include necessary circuitry to process analog or digital signals as inputs to play from zone player 400, send to another zone player on a network, or both play and send to another zone player on the network. An example input includes a line-in connection (e.g., an auto-detecting 3.5mm audio line-in connection).

The audio amplifier 416 is a device(s) that amplifies audio signals to a level for driving one or more speakers 418. The one or more speakers 418 can include an individual transducer (e.g., a "driver") or a complete speaker system that includes an enclosure including one or more drivers. A particular driver can be a subwoofer (for low frequencies), a mid-range driver (middle frequencies), and a tweeter (high frequencies), for example. An enclosure can be sealed or ported, for example. Each transducer may be driven by its own individual amplifier.

A commercial example, presently known as the PLAY:5, is a zone player with a built-in amplifier and speakers that is capable of retrieving audio directly from the source, such as on the interne or on the local network, for example. In particular, the PLAY:5 is a five-amp, five-driver speaker system that includes two tweeters, two mid-range drivers, and one woofer. When playing audio content via the PLAY:5, the left audio data of a track is sent out of the left tweeter and left mid-range driver, the right audio data of a track is sent out of the right tweeter and the right mid-range driver, and mono bass is sent out of the subwoofer. Further, both mid-range drivers and both tweeters have the same equalization (or substantially the same equalization). That is, they are both sent the same frequencies, just from different channels of audio. Audio from interne radio stations, online music and video services, downloaded music, analog audio inputs, television, DVD, and so on, can be played from the PLAY:5.

IV. Controller

Figure 5:
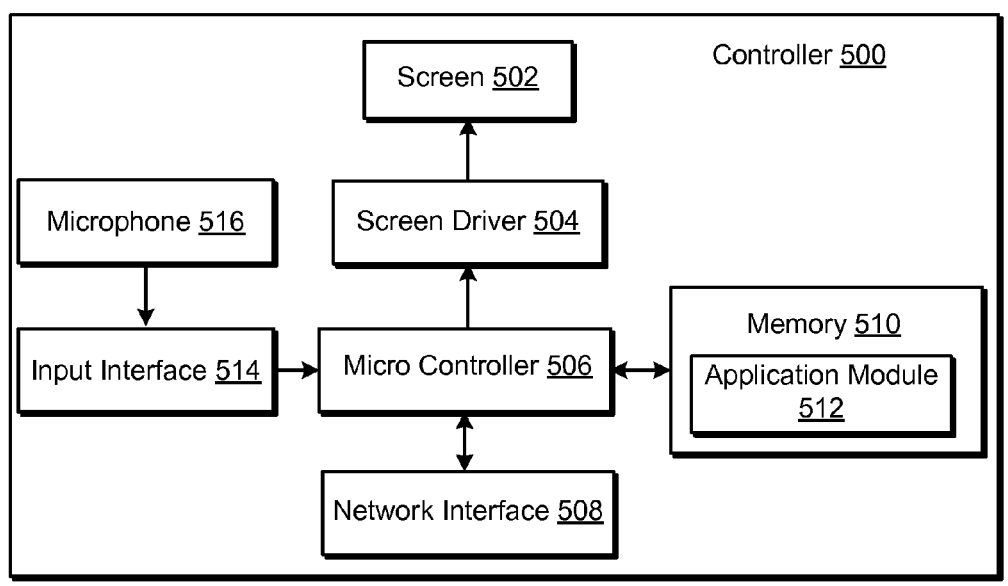
FIG. 5 shows an internal functional block diagram of an example controller.

Referring now to FIG. 5, there is shown an example block diagram for controller 500, which can correspond to the controlling device 130 in FIG. 1. Controller 500 can be used to facilitate the control of multi-media applications, automation and others in a system. In particular, the controller 500 may be configured to facilitate a selection of a plurality of audio sources available on the network and enable control of one or more zone players (e.g., the zone players 102-124 in FIG. 1) through a wireless or wired network interface 508. According to one embodiment, the wireless communications is based on an industry standard (e.g., infrared, radio, wireless standards IEEE 802.11a, 802.11b 802.11g, 802.11n, or 802.15). Further, when a particular audio is being accessed via the controller 500 or being played via a zone player, a picture (e.g., album art) or any other data, associated with the audio and/or audio source can be transmitted from a zone player or other electronic device to controller 500 for display. In one example, the controller may be used for entering and in some cases, exiting audition mode. Further details relating to the use of the controller for entering and exiting audition mode is provided in a later section.

Controller 500 is provided with a screen 502 and an input interface 514 that allows a user to interact with the controller 500, for example, to navigate a playlist of many multimedia items and to control operations of one or more zone players. The input interface 514 may be coupled to a microphone 516 for capturing audio signals, such as audio content or voice commands as control inputs. The screen 502 on the controller 500 can be an LCD screen, for example. The screen 500 communicates with and is commanded by a screen driver 504 that is controlled by a microcontroller (e.g., a processor) 506. The memory 510 can be loaded with one or more application modules 512 that can be executed by the microcontroller 506 with or without a user input via the user interface 514 to achieve certain tasks. In some embodiments, an application module 512 is configured to facilitate grouping a number of selected zone players into a zone group and synchronizing the zone players for audio play back. In some embodiments, an application module 512 is configured to control the audio sounds (e.g., volume) of the zone players in a zone group. In operation, when the microcontroller 506 executes one or more of the application modules 512, the screen driver 504 generates control signals to drive the screen 502 to display an application specific user interface accordingly.

The controller 500 includes a network interface 508 that facilitates wired or wireless communication with a zone player. In some embodiments, the commands such as volume control and audio playback synchronization are sent via the network interface 508. In some embodiments, a saved zone group configuration is transmitted between a zone player and a controller via the network interface 508. The controller 500 can control one or more zone players, such as 102-124 of FIG. 1. There can be more than one controller for a particular system and each controller may share common information with another controller, or retrieve the common information from a zone player, if such a zone player stores configuration data (e.g., such as a state variable). Further, a controller can be integrated into a zone player.

It should be noted that other network-enabled devices such as an iPhone®, iPad® or any other smart phone or network-enabled device (e.g., a networked computer such as a PC or Mac®) can also be used as a controller to interact or control zone players in a particular environment. In some embodiments, a software application or upgrade can be downloaded onto a network-enabled device to perform the functions described herein.

In certain embodiments, a user can create a zone group (also referred to as a bonded zone) including at least two zone players from the controller 500. The zone players in the zone group can play audio in a synchronized fashion, such that all of the zone players in the zone group play back an identical audio source or a list of identical audio sources in a synchronized manner such that no (or substantially no) audible delays or hiccups could be heard. Similarly, in some embodiments, when a user increases the audio volume of the group from the controller 500, the signals or data of increasing the audio volume for the group are sent to one of the zone players and causes other zone players in the group to be increased together in volume.

A user via the controller 500 can group zone players into a zone group by activating a "Link Zones" or "Add Zone" soft button, or de-grouping a zone group by activating an "Unlink Zones" or "Drop Zone" button. For example, one mechanism for 'joining' zone players together for audio play back is to link a number of zone players together to form a group. To link a number of zone players together, a user can manually link each zone player or room one after the other. For example, assume that there is a multi-zone system that includes the following zones: Bathroom, Bedroom, Den, Dining Room, Family Room, and Foyer.

In certain embodiments, a user can link any number of the six zone players, for example, by starting with a single zone and then manually linking each zone to that zone.

In certain embodiments, a set of zones can be dynamically linked together using a command to create a zone scene or theme (subsequent to first creating the zone scene). For instance, a "Morning" zone scene command can link the Bedroom, Office, and Kitchen zones together in one action. Without this single command, the user would need to manually and individually link each zone. The single command might include a mouse click, a double mouse click, a button press, a gesture, or some other programmed action. Other kinds of zone scenes can be programmed.

In certain embodiments, a zone scene can be triggered based on time (e.g., an alarm clock function). For instance, a zone scene can be set to apply at 8:00 am. The system can link appropriate zones automatically, set specific music to play, and then stop the music after a defined duration. Although any particular zone can be triggered to an "On" or "Off" state based on time, for example, a zone scene enables any zone(s) linked to the scene to play a predefined audio (e.g., a favorable song, a predefined playlist) at a specific time and/or for a specific duration. If, for any reason, the scheduled music failed to be played (e.g., an empty playlist, no connection to a share, failed Universal Plug and Play (UPnP), no internet connection for an internet Radio station, and so on), a backup buzzer can be programmed to sound. The buzzer can include a sound file that is stored in a zone player, for example.

V. Audio Content Auditioning

In an example system such as the one shown in FIG. 1, where multiple zone players such as those shown in FIG. 2 and/or FIG. 4 are in different zones or zone groups and may be playing one or more audio contents at the same time, the ability to preview audio content with minimal disruption to existing playback may be valuable.

As suggested previously, "audition mode" differs from conventional playback options such as "Play Now" or "Play Next" because, unlike these playback options that may substantially and/or possibly permanently alter the playback queue when new audio content is selected, audition mode is designed to temporarily suspend the current playback in a zone or group of zones without permanently altering the existing playback queue or audio stream. In other words, when "audition mode" is terminated, the suspended playback may be resumed without substantially affecting the original playback queue or audio stream. Illustrative examples of the audio content auditioning concept, as applied to different scenarios and different system devices are discussed below.

A. Audition Mode

The example audio content auditioning method may be implemented on an example system such that one or more users may, among other things, preview tracks or songs, radio stations, streaming content.

Figure 6A:
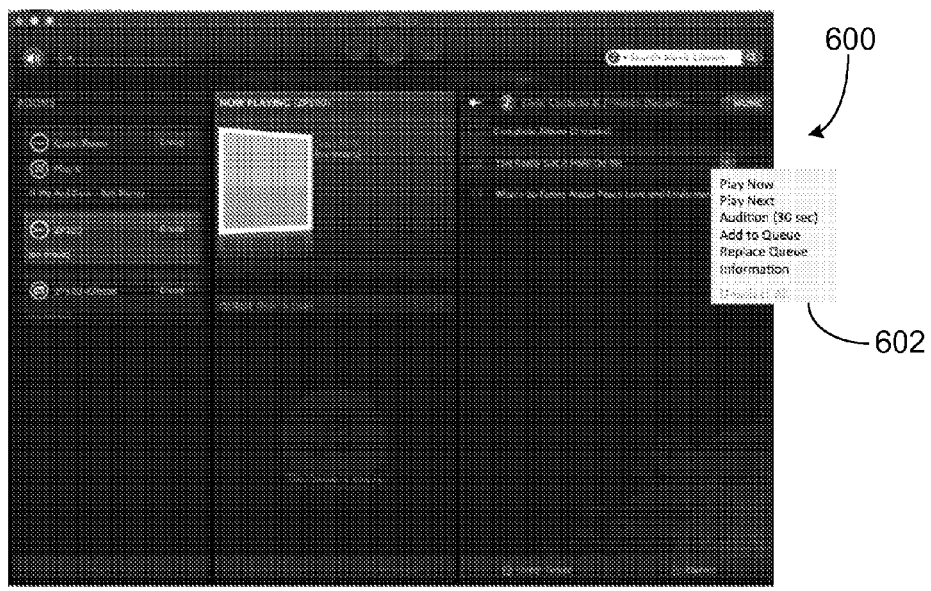
FIG. 6A shows a first example interface for initiating audio content playback.
Figure 6B:
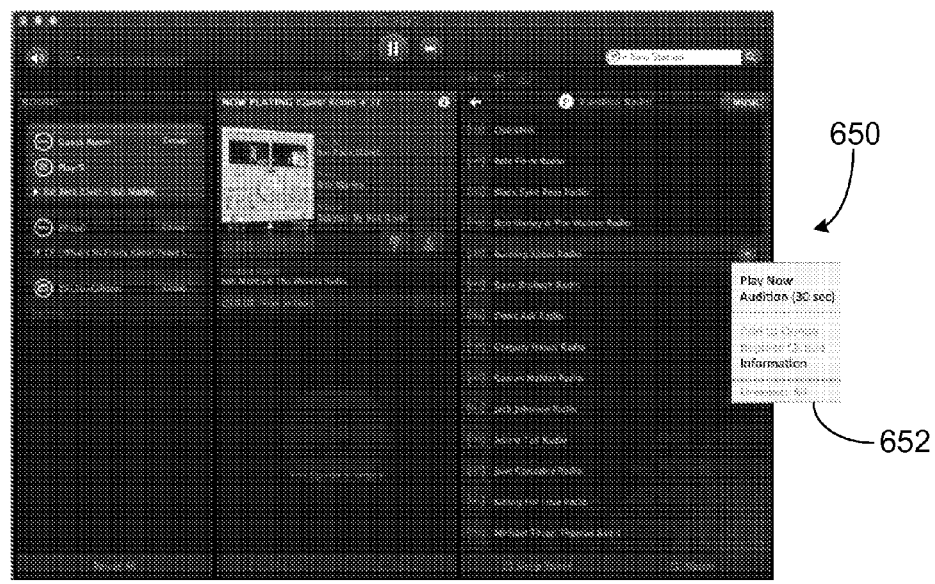
FIG. 6B shows a second example interface for initiating audio content playback.

In the example system, audio content playback in a regular mode may be done by adding tracks to a playback queue and selecting "Play," using one or more controllers, such as the controller shown in FIGS. 3 and/or FIG. 5, and via the example controller interfaces 600 and 650 of FIGS. 6A and 6B, respectively. This may be done in multiple steps, for example, by first adding a track to the queue using the "Play Next" or "Add to Queue" option provided on the controller, followed by selecting the "Play" option. Alternatively, this may be done, for example, in a single step by selecting a track using the "Play Now" option on the controller that adds the track to the queue and automatically begins playing the track.

FIGS. 6A and 6B show a first example interface 600 and a second example interface 650, respectively, for initiating audio content playback, according to an embodiment of the present application. In one example, the first example interface 600 and second example interface 650 may be provided on the screens 304 and/or 502 of the controllers 300 and/or 500, respectively. As shown in the first example interface 600, a first list of options 602 for playback of audio content may be provided for the user to choose from when the user selects the second audio content for playback. The first list of options 602 may include the options of "Play Now," "Play Next," "Audition (30 sec)," "Add to Queue," and "Replace Queue." A second list of options 652 shown in the second example interface 650 may be provided for the user to choose from when the user selects the second audio content for playback, and may include the options of only "Play Now" and "Audition (30 sec)."

In the example system, the playback queue may include, for each track, a uniform resource locator (URL) identifying where the content is located. Further, the audio content may be located on a device in the local area network (LAN) or it may reside in the "cloud" over the Internet. As additional audio tracks are selected, the tracks may be added to the playback queue such that the tracks may be played following an order (e.g., sequentially or in random order). In one example, there may be a playback queue for each zone or zone group.

In addition to playing audio tracks from a playback queue, the example system may also play audio streams directly without adding them to the playback queue. For instance, this may be done by selecting an available stream (e.g., Pandora radio station) and using the "Play Now" option on the controller. In another instance, this may be done by selecting an intercom function on a controller or player, and then speaking into a microphone connected to the system (e.g., microphones 422 and 516 embedded into the zone player 400 or controller 500). When an audio stream is played in this way, any audio stream currently being played may be stopped and discarded or otherwise not received and/or played by the system. However, the playback queue of audio tracks may not be affected. In this example system, zones and zone groups may also play streaming audio content.

With the example system, a user may select content for audition or put the system into an audition mode, as previously described as playback options provided when selecting a track or a streaming audio content. For example, the playback options for playing an indexed track may include "Play Now", "Play Next", "Audition", "Add to Queue", and "Replace Queue," as shown in FIG. 6A. In another example, the playback options for playing streaming content may include only "Play Now" and "Audition," as shown in FIG. 6B. In yet another example, the playback option may be limited to include only "Intercom". As such, the differences in options may reflect the limitations associated with different types of audio content, and audio content sources.

Audition mode differs from other playback options such as "Play Now", "Play Next", etc. because, unlike these playback options that may substantially and/or permanently alter the playback queue or current audio stream when new audio content is selected and added, audition mode is designed to temporarily interrupt or suspend the current playback in a zone or group of zones without permanently altering the existing playback queue or audio stream. As such, in the example system, when audition mode is exited or terminated, the interrupted or suspended playback may be resumed seamlessly without significantly affecting the original playback queue or audio stream.

Audition mode may be set to last for a fixed duration of time or until a user manually exits the mode. In one example, the duration of time may be a system parameter that can be configured by the user using a user interface on a controller. For example, the duration of time for audition mode may be initially set at 30 seconds, but users may modify the duration of time in increments of, for example, 15 seconds, or decide to manually terminate the audition prior to the expiration of the time period. In another example, the duration of time may be set to a fixed value that cannot be changed by the user. For instance, content licensing agreements may restrict the playback time for previewing certain premium or pay-for content.

In yet another example, audition mode may last until the content is complete or until the user manually exits the mode. For instance, if a single track were selected, audition mode may end when the track is finished or when the user exits the mode. In a further example, if a track on a playlist was selected, the tracks of the playlist may play sequentially (or in random order, if desired) and in their entirety in audition mode until the playlist is complete or until the user exits the mode. In other words, the entire playlist may be auditioned. In yet a further example, if a streaming radio station were selected for auditioning, audition mode may end when the stream was terminated or until when the user manually exits the mode.

In one example, audition mode may be selected for a zone or zone group, such as the "Family Room" zone with zone players 106 and 108, the "Bedroom" zone with zone player 112, or the zone group including both the "Family Room" zone and the "Bedroom" zone. In one case, the selection of audition mode for a zone or zone group may be performed by the user through one of the controller(s). In this case, the zone player(s) in the zone or zone group may each store an updated state variable that indicates the zone is in audition mode. In some instances, a zone player may know it is in audition mode based on the state variable stored in memory at the player.

Further, in another case, the controller(s) in the system may identify that a zone or zone group is in audition mode by querying a zone player in the zone or zone group for the state variable. The controllers may use this information to display on a display screen, which may also provide the controller interface, that a zone or zone group is currently in audition mode. In addition, the identity of the user requesting the playing of audio content in audition mode may also be displayed on the display screen.

In one example, the user requesting the playing of audio content in audition mode may be identified and displayed for other users to see. In one case, the user may be identified in the playback queue alongside the track name or in the "Now Playing" screen along with an indication that the zone is currently in audition mode. In another case, the user may be identified by drilling down (e.g., double-click, touch, hover over, etc.) on the track name. Further, the user may be identified simply by the identification of the device being used as a controller of the system (e.g., the device may be identified by a unique ID such as a MAC address that has been registered in the system). For instance, as applied to a Sonos system, the Sonos CONTROLLER or a device with a Sonos Controller application may be registered as such a device. In another instance, "Jonathan's iPhone" may be considered such a device if it is Jonathan's Sonos system, for example.

B. Audition Play on Controller

In one example, the audio content may be played on the system controller, which may not typically be used to playback audio in the system. For instance, as mentioned above, the Sonos CONTROLLER, or a device with a Sonos Controller application (for example, a PC or MAC, iPod, iPhone, iPad, or Android mobile device) may be considered such a device. In this instance, the audio may be played through speaker(s) on the controller or through headphones connected wired or wirelessly to the controller. In this example, the controller may be used to render the audio content in audition mode before it is played back over the primary system playback devices (for example, the CONNECT, CONNECT:AMP, PLAY:5, and PLAY:3 audio players which are offered by Sonos, Inc. of Santa Barbara Calif.). As such, the user may preview the audio content before the audio content is played in a shared environment.

C. Audition Plays on Player or Zone(s)

In one example, the audio content may be played in a single listening zone or a grouped listening zone, such as the "Family Room" zone with zone players 106 and 108, the "Bedroom" zone with zone player 112, or the zone group including both the "Family Room" zone and the "Bedroom" zone, as discussed above. A single listening zone may consist of a single zone player or a group of zone players that are bonded together to provide coordinated and synchronized playback in a single zone. For instance, two PLAY:3 devices may be bonded together to play the left and right channel of stereo audio in the "Living Room" zone of FIG. 1. A grouped zone may combine multiple zones into a single grouped zone for synchronized playback. For instance, a grouped zone may include zones "Living Room", "Family Room", and "Den." In this instance, zone players in the (single or grouped) zone may render the audio content in audition mode before the audio content is played back in a greater audio sharing environment, which may or may not include the (single or grouped) zones selected for audition mode.

When audition mode is selected in a grouped zone, several playback options may be available. In one example, all of the players in the grouped zone may play the audio content in audition mode in synchrony. In one case, only one zone of the grouped zones may play the audio content in audition mode, while the remaining zones of the grouped zone either remain silent or continue playing back the audio content that was already playing. For instance, if the "Living Room", "Family Room", and "Den" zones are part of a grouped zone, the content in audition mode may be directed to play only in the "Den" zone. In another case, a single zone player (e.g., as selected by the user) of a bonded zone may play the audio content in audition mode. For instance, the zone player closest to the user may be selected to play audio content in audition mode while the other bonded players are not impacted, remaining silent or continuing to play back what was already playing. In yet another case, an additional output of a zone player may be used to play the audio content in audition mode. For instance, headphones connected to a zone player may be used to playback the content in audition mode.

To further illustrate the operation of audition mode, Tables 1-4 provide an example sequence of the zones and zone players of FIG. 1 entering and exiting audition mode.

TABLE 1

| ZONE | PLAYBACK DEVICE | AUDIO PLAYBACK | AUDITION MODE |
|---|---|---|---|
| Office | 110 | — | No |
| Bathroom | 114 | — | No |
| Bedroom | 112 | — | No |
| Kitchen | 102 | Radio | No |
| Kitchen | 130* | — | No |
| Dining Room | 104 | Radio | No |
| Family Room | 106 | Radio | No |
| Family Room | 108 | Radio | No |
| Home Theater Room | 116 | Movie | No |
| Home Theater Room | 118 | Movie | No |
| Home Theater Room | 132 | Movie | No |
| Home Theater Room | 120 | Movie | No |
| Laundry Room | 122 | — | No |
| Patio | 124 | — | No |

Table 1 provides a list of the different zones and playback devices illustrated in FIG. 1, and the associated audio playback content and audition mode status. In an initial state, playback devices 110 in the office, playback device 112 in the bedroom, playback 114 in the bathroom, playback device 122 in the laundry room, and playback device 124 on the patio are not playing any audio content and are accordingly also not in audition mode. Playback devices 116, 118, 120, and 132 in the home theater room may be playing the corresponding audio track to a movie being watched. In this case, because the audio track may be playing in accordance with the movie being watched, the playback devices 116, 118, 120, and 132 may be in regular mode or movie mode, but not in audition mode.

In addition, the playback device 102 in the kitchen, playback device 104 in the dining room, and playback devices 106 and 108 in the family room may be playing radio (in the form of streaming internet radio, for example). As described earlier, the playback device 130 is a controller that may also have audio playback capability. In this initial state, the user may have chosen to exclude the controller 130 from playing the radio content, even though the controller 130 is also in the kitchen where playback device 102 is playing the radio content.

For the following illustration of the operation of audition mode, changes in playback by playback devices 102 and 130 in the kitchen, playback device 104 in the dining room, and playback devices 106 and 108 will be discussed.

TABLE 2

| ZONE | PLAYBACK DEVICE | AUDIO PLAYBACK | AUDITION MODE |
|---|---|---|---|
| Kitchen | 102 | Music Track | Yes |
| Kitchen | 130* | Music Track | Yes |
| Dining Room | 104 | — | No |
| Family Room | 106 | Radio | No |
| Family Room | 108 | Radio | No |

As shown in Table 2, playback devices 102 and 130 in the kitchen may enter audition mode to preview a music track. In this case, the music track may be a newly acquired song or album the user wishes to preview. The user may have selected (via the controller 130, for example) to preview the music track in the kitchen, including the use of the controller 130 as a playback device. As such, playback devices 102 and 130 in the kitchen may enter audition mode for the user to preview the music track. In this case, the dining room may be in close proximity to the kitchen, and as a result, the playback device 104 in the dining room may be muted so no audio playback by the playback device 104 in the dining room bleeds into the kitchen and interrupt the preview of the music track. The muting of dining room playback device 104 in this case may be preconfigured or manually requested by the user when entering audition mode.

TABLE 3

| ZONE | PLAYBACK DEVICE | AUDIO PLAYBACK | AUDITION MODE |
|---|---|---|---|
| Kitchen | 102 | Radio | No |
| Kitchen | 130* | — | No |
| Dining Room | 104 | Radio | No |
| Family Room | 106 | Radio | No |
| Family Room | 108 | Radio | No |

As shown in Table 3, playback devices 102 and 130 in the kitchen and playback device 104 in the dining room may have exited audition mode. Exiting audition mode, as will later be discussed, may be because a predetermined duration for audition mode, such as 15 seconds, has expired, because the music track has completed playback, or because the user requested that audition mode be terminated. Whichever the case, the playback devices 102, 130, and 104 have returned upon exiting audition mode to their initial states as previously shown in Table 1.

Alternative to returning to the initial states as previously shown in Table 1, the user may also, while previewing to the music track in audition mode, decide to switch the regular mode playback by playback devices 102, 130, and 104 to that of the music track rather than the radio, thereby exiting audition mode. As such, playback devices 102, 130, and 104 may now be playing the music track in a non-audition mode. Further, as shown in Table 4, playback devices 102 and 140 in the kitchen, playback device 104 in the dining room, and playback devices 106 and 108 in the family room may all be switched to a regular mode playback of the music track. This may be the case in which after previewing the music track in the kitchen, the user decides to share the music track with everyone in the dining room and family room as well.

TABLE 4

| ZONE | PLAYBACK DEVICE | AUDIO PLAYBACK | AUDITION MODE |
|---|---|---|---|
| Kitchen | 102 | Music Track | No |
| Kitchen | 130* | Music Track | No |
| Dining Room | 104 | Music Track | No |
| Family Room | 106 | Music Track | No |
| Family Room | 108 | Music Track | No |

D. Audio Content for Audition

In the example system, audio content that is played in audition mode may come from many different sources. This may include local content on the Local Area Network, content on the controllers, or even "cloud-based" content from the Internet. In one case, the same sources of content may be available in audition mode as may be available in playback mode. In another case, the sources of content available in audition mode may be different from the content available in regular playback mode. For instance, audition mode may be utilized for listening to audio content from a mobile phone on a temporary basis.

In one example, the audition audio content selected for audition mode may be selected from sources associated with the system. This may include an indexed audio library or playlist that may be on the Local Area Network (e.g., audio stored on a PC or MAC computer, a network attached storage device, a docked iPod, iPhone, or iPad, or another wired or wireless device that has been indexed as part of the system), an indexed audio library that is stored in the "cloud" over the internet (e.g., a cloud-based audio storage such as Apple iCloud or Amazon Cloud Player, etc.), an internet audio service that provides streaming content over the internet (e.g., Rhapsody, Spotify, Pandora, etc.), or an internet radio service that streams live broadcast radio. In another example, the audition audio may be streamed to the Sonos system from a 3rd party application such as Spotify or Facebook. In another example, the audition audio may be streamed directly from the device from which it resides (e.g., audio stored on an iPhone, iPad, iPod, or Android device).

In yet another example, the audition audio content selected for audition mode may be selected from another listening zone that may currently be playing the same audition audio content in regular playback mode. For example, the user may be playing audition audio content in audition mode in the "Master Bedroom" zone that may also be currently playing in the "Living Room" zone in regular playback mode. In this example, the audition audio content playing in audition mode in one zone may be synchronized with the playback of the same audio content in the other zone. In one case, using audition mode to listen to audio content currently being played in another zone may not require the user to group the zones into a zone group.

In yet another example, the audition audio content selected may be first captured via a microphone (e.g., microphones 422 and 516 embedded into the zone player 400 or controller 500 controller) and streamed directly from the device where the audition audio content is captured by the microphone. For example, a microphone on a mobile device (e.g., an iPhone, iPad, iPod, or Android device) may be used to capture and stream audio in audition mode. In another example, a microphone may be included on a zone player such that the audio may be captured and streamed in audition mode.

E. Audition Mode and Playback Control

In the example system, the playback controls normally used to play content may be used in audition mode, and they may be reset to the regular playback mode levels after audition mode is exited or terminated. For example, the volume level may have been adjusted up or down during playback in audition mode. As such, when the system exits audition mode, the volume may be returned to the original level. In addition, seek forward and seek backward control inputs may also be applied during playback of a track or playlist in audition mode. In general, any of the playback controls available during normal playback of audio content may be available during audition mode, and the regular playback mode levels may be reset to the playback levels at the time of entering audition mode when audition mode is exited or terminated.

F. Audition Mode and the Playback Queue

In the example system, audition mode may be configured to not permanently affect the regular playback queue. In one example, the track, playlist, or streaming audio content may be displayed in the "Now Playing" screen on the controller display screen with an indication that the system or specific playback device is in audition mode. In the case that more than one controller is being used, the same information may be obtained by all controllers and may be displayed by any controller in the system.

In another example, the track, playlist, or streaming audio content may be temporarily added to the regular playback queue with an indication that the track(s) or station is currently in audition mode. In both examples, the state of the regular playback queue may be preserved when entering audition mode, and may be returned to upon exiting or terminating audition mode.

G. Audition Mode and Zone Grouping

As suggested above, the zone group used to play content in audition mode may be different from the zone group used to play content in normal mode, and the zone group may be reset to the zone group used in normal mode after audition mode is exited or terminated. For example, zone players shown in FIG. 1 may be playing audio content in the initial playback state provided in Table 1, such that the kitchen, dining room, and family room are in a first regular mode zone group playing radio audio content, and the home theater room is in a second regular mode zone group playing movie audio content.

In this example, the user may wish to listen to audio content in audition mode on each of the zone players in the home theater room, in addition to the zone players in the family room. As such, the zone players in the home theater room and the family room may form a first audition mode zone group, while the zone players in the kitchen and dining room may form a second audition mode zone group. In this case, the grouping of zones may be configured to return to the original grouping upon exiting audition mode. In other words, when audition mode is terminated, the playback of radio audio content may resume at each of the zone players in the first regular mode zone group including zone players in the kitchen, dining room, and family room, while the playback of movie audio content may resume at the zone players in the second regular mode zone group including zone players in the home theater room.

VI. Example Methods for Audio Content Auditioning

In a system such as those described above, methods may be implemented such that a user can put the system into an "audition mode" (e.g., quick-listen mode) as part of playback options available when selecting audio content (e.g., music, talk radio, books, the audio from television, etc.). A method for operating the system in "audition mode" is discussed in further detail below.

Figure 7:
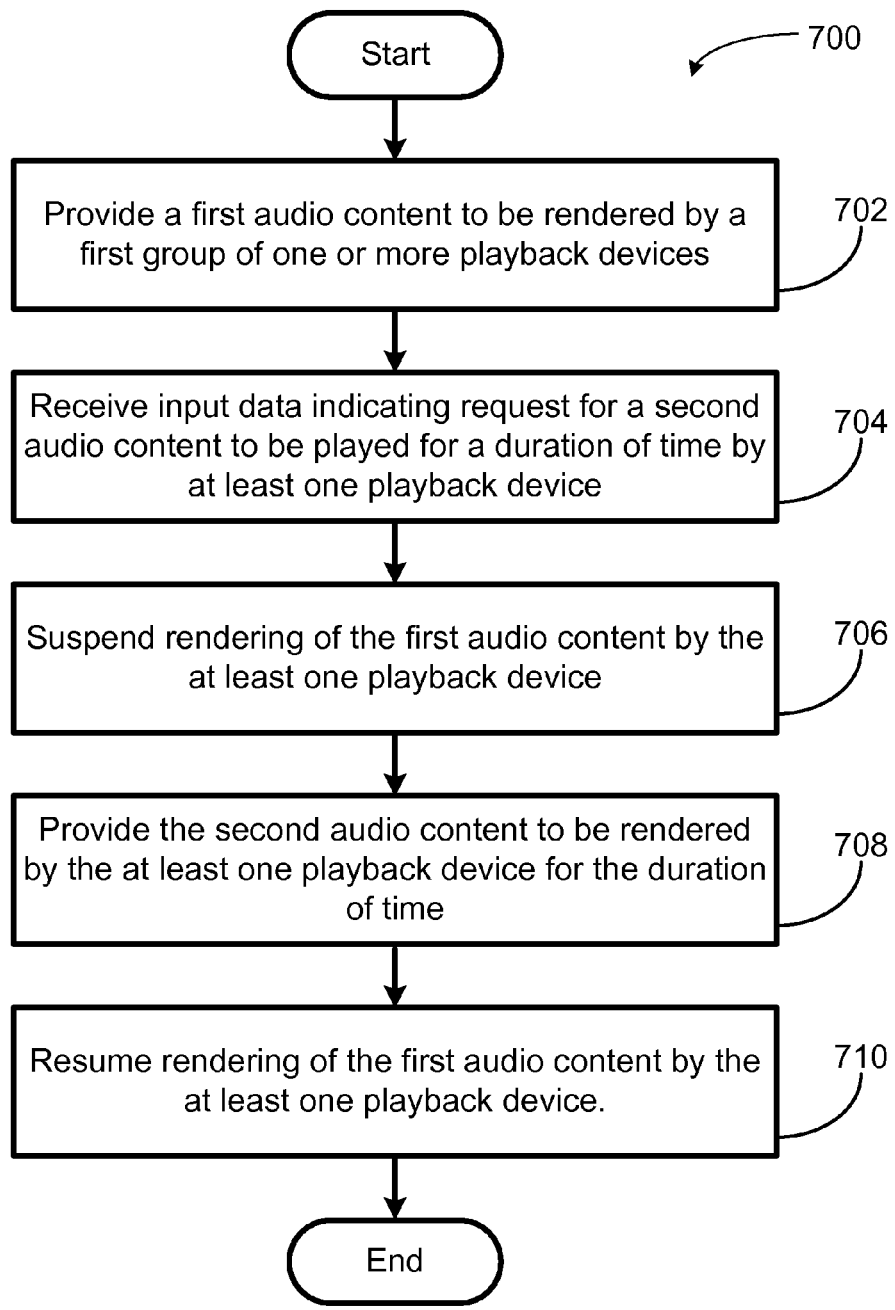
FIG. 7 shows an illustrative block diagram for providing audio content auditioning.

FIG. 7 shows an illustrative block diagram of an example method 700 for providing audio content auditioning, in accordance with at least some embodiments described herein. Method 700 shown in FIG. 7 presents an embodiment of a method that could be used with the systems 200, 202, 204, 300, 400, and 500 for example, and may be performed by a device, such as devices illustrated in FIGS. 3-5, or components of the device. Method 700 may include one or more operations, functions, or actions as illustrated by one or more of blocks 702-710. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 700 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 700 and other processes and methods disclosed herein, each block in FIG. 7 may represent circuitry that is wired to perform the specific logical functions in the process.

At block 702, the method 700 includes provide a first audio content to be rendered by a first group of one or more playback devices. As discussed previously, the first audio content may be from sources associated with the system, such as a discrete audio storage device, an indexed audio library or playlist on the Local Area Network or the "cloud," or an internet service providing streaming audio content.

In one example, the first audio content may be rendered in response to the first audio content being selected for playback or being added to a playback queue. In one case, the first audio content may include a playback queue of multiple audio files, which may or may not be from the same source. The first group of one or more playback devices may be zone players included in one or more zone or zone groups, as discussed previously. For instance, the first group of one or more playback devices may include zone players in the "Den" zone and "Family Room" zone, as shown in FIG. 1.

At block 704, the method 700 includes receive input data indicating a request for a second audio content to be played for a duration of time by at least one playback device. In one example, the at least one playback device may be from among the first group of one or more playback devices. In another example, the input data may be received from a controller like the controller 300 or 500 discussed above. Similar to the first audio content discussed in connection to block 702, the second audio content may also be from any sources associated with the system, and may include a playback queue of multiple audio files as well. In one case, the second audio content may be from the same source as the first audio content. In another case, source of the second audio content may be different from the source of the first audio content.

In one case, the input data indicating a request for the second audio content to be played for the duration of time may be received when a user wishes to play the second audio content in audition mode, as previously discussed. In one instance, the user may interact with a controller interface to cause the second audio content to be played in audition mode. As discussed previously, FIGS. 6A and 6B show a first example interface 600 and a second example interface 650, respectively, for initiating audio content playback, according to an embodiment of the present application. In one example, the first example interface 600 and second example interface 650 may be provided on the screens 304 and/or 502 of the controllers 300 and/or 500, respectively.

As mentioned above, the first list of options 602 for playback of audio content may be provided for the user to choose from when the user selects the second audio content for playback. The first list of options 602 may include the options of "Play Now," "Play Next," "Audition (30 sec)," "Add to Queue," and "Replace Queue." This may be the case when the second audio content selected by the user is an indexed audio track. The second list of options 652 shown in the second example interface 650 may be provided for the user to choose from when the user selects the second audio content for playback, and may include the options of only "Play Now" and "Audition (30 sec)." This may be the case when the second audio content selected by the user is streaming audio. In other words, differences in the playback options may reflect the limitations associated with different types of audio content. In either case, the user may play the audio content in audition mode by selecting "Audition (30 sec)."

In one example, the duration of time for audition mode playback may be a predetermined duration. For instance, as shown in the example first list of options 602 and example second list of options 652, the duration of time for audition mode playback may be preset at 30 seconds. In another instance, the duration of time for audition mode playback may be preset at 10, 15, or 20 seconds, for example. In yet another instance, if the second audio content is an indexed audio track, the duration of time for audition mode playback may be configured to be the full length of the audio track, for example, such that the entire audio track may be played. Similarly, the duration of time for audition mode may also be configured to be half or quarter of the length of the second audio content, for example. In these instances, the duration of time may be configured by the user when configuring the system. The duration of time for audition mode playback may further vary between playback devices and/or controllers within the system.

Further, the duration of time for audition mode playback may refer to the full length of audition mode, or the duration for which to play each audio file within a playback queue. For instance, a duration of time of 15 seconds may be set such that while in audition mode, each audio file in the queue representing the second audio content is rendered for 15 seconds before moving on to the next audio file in the queue.

In a further example, the user may be prompted via the controller interface to indicate the duration of time when the user selects the second audio content for audition mode playback. In one case, the system may also be configured such that audition mode lasts the duration of time, or until the user wishes to exit audition mode, and indicates as such via the controller interface.

In addition to indicating the request to playing the second audio content for the duration of time, the input data received at block 704 of the method 700 may also indicate at least one playback device for playing the second audio content. The at least one playback device may be zone players in a zone or a zone group, as previously discussed. In one case, the zone or zone group within which zone players will play the second audio content may be selected by the user via the controller interface. In this case, the user may be prompted via the controller interface to indicate the zone player, zone, or zone group when the user selects the second audio content for audition mode playback. In one example, the at least one playback device may be one of the one or more playback devices playing the first audio content. Upon entering audition mode, the controller interface may provide an indication of which zone players, zones, or zone groups are in audition mode, and further, what audio content is being played the corresponding audition mode.

At block 706, the method 700 includes suspending rendering of the first audio content by the at least one playback device. As mentioned in the example above, the at least one playback device may be one of the one or more playback devices playing the first audio content. As such, playback of the first audio content by the at least one playback device may be suspended before playback of the second audio content by the at least one playback device.

Suspending playback of the first audio content by the at least one playback device may involve pausing playback of the first audio content or muting playback of the first audio content. Determining whether to pause or mute playback of the first audio content may depend on determining whether the first audio content can be paused. For instance, if the first audio content is an indexed track, suspending the first audio content may involve pausing the indexed track. On the other hand, if the first audio content is received in the form of an audio stream from the internet, the first audio content may not be able to be paused. Accordingly, suspending the first audio content may require muting the audio stream. Alternative to muting the first audio content if the first audio content is an audio stream from the internet, for example, the first audio content may also be buffered, such that the first audio content may be effectively "paused." In one example, the buffering of the first audio content may be configured to last the as long as the first audio content is muted. In this case where the muted audio stream is also buffered, the first audio content may be effectively considered a paused audio content for the purposes of audition mode entering and exiting.

In another instance, the at least one playback device may be a zone player in a zone with other zone players playing the first audio content. In this instance, the other zone players may not have been selected to play the second audio content in audition mode. For example, in the "Home Theater" zone shown in FIG. 1, each of the zone players 116, 118, 120, and 132 may have been playing the first audio content, but only zone player 120 was selected to play the second audio content in audition mode. In this instance, suspending playback of the first audio content by the at least one playback device may involve pausing or muting the playback of the first audio content by zone player 120, while also reducing the playback volume of the other zone players in the "Home Theater" zone 116, 118, and 132. In another instance, the zone player 120 may pause or mute playback of the first audio content, while the other zone players in the "Home Theater" zone 116, 118, and 132 continue playing normally.

On the other hand, if the non-selected playback devices in the first group of one or more playback devices are not in the same zone or zone group of the selected at least one playback device to render the second audio content, the non-selected playback devices may continue to render the first audio content without suspension. In either instance, upon suspending playback of the first audio content by the at least one playback device, audition mode playback of the second audio content by the at least one playback device may occur.

At block 708, the method 700 includes providing the second audio content to be rendered by the at least one playback device for the duration of time. In one example, the second audio content may be rendered by the at least one playback device in a similar manner as the first audio content was rendered by the at least one playback device. In other words, save for the predetermined time duration, rendering of the second audio content in audition mode may be substantially the same as rendering of the first audio content. Further, playback options and controls, such as volume control or equalization available during a regular mode of playback may also be available in audition mode playback.

In one case, the second audio content selected for playback in audition mode may be presently rendered by a second group of one or more playback devices. In this case, providing the second audio content to be rendered by the at least one playback device for the duration of time may involve synchronizing the rendering of the second audio content by the at least one playback device with the second audio content rendered by the second group of one or more playback devices.

For example, referring to FIG. 1, zone players 106 and 108 in the "Family Room" zone may be rendering the second audio content in a regular mode of playback, while zone player 112 in the "Bedroom" zone may be rendering the first audio content in a regular mode of playback. In one case, if the user requests the playback of the second audio content in audition mode by the zone player 112, the audition mode playback of the second audio content by the zone player 112 in the "Bedroom" zone may be synchronized with the playback of the second audio content by the zone players 106 and 108 in the "Family Room" zone.

At block 710, the method 700 includes resuming rendering of the first audio content by the at least one playback device. In one example, once the at least one playback device exits audition mode, whether due to completion of the second audio content, expiration of the duration of time, or at the request of the user, the at least one playback device may resume rendering the first audio content.

In one case, resuming rendering of the first audio content may include reverting audio playback settings for rendering the first audio content prior to the playback of the second audio content in audition mode. For instance, a volume level and/or equalization may have been adjusted during playback of the second audio content in audition mode. In this instance, when playback of the first audio content by the at least one playback device is resumed, the volume level and/or equalization may be reverted back to the levels prior to the playback of the second audio content in audition mode.

As discussed previously, playback of the first audio content may be suspended by pausing or muting the first audio content by the at least one playback device when rendering the second audio content. In the case the first audio content was paused, resuming playback of first audio content may involve resuming playback of the first audio content from where the first audio content was paused. In the case the first audio content was muted, resuming playback of the first audio content may involve unmuting the first audio content.

In either case, other playback devices in the first group of one or more playback devices may have continued to render the first audio content while the at least one playback device rendered the second audio content in audition mode. In this case, resuming rendering of the first audio content by the at least one playback device may further involve synchronizing the first audio content rendered by the at least one playback device with the first audio content rendered by the playback devices in the first group of one or more playback devices other than the at least one playback device. This synchronization may be provided to ensure seamless transition between audition mode playback and other modes of playback.

In an example, referring to FIG. 1, zone players 106 and 108 in the "Family Room" zone, and zone player 112 in the "Bedroom" zone may be in a zone group rendering the first audio content. Zone player 112 may then be selected to render the second audio content in audition mode and may have paused the first audio content, while zone players 106 and 108 continue to render the first audio content. Upon exiting audition mode, zone player 112 may resume playback of the first audio content. However, instead of resuming from where the first audio content was paused, zone player 112 may synchronize playback of the first audio content with the playback of the first audio content of zone player 106 and 108 for an optimized aural experience in which playback of the first audio content by zone players in a zone group are synchronized.

In addition to resuming playback of the first audio content upon exiting audition mode playback of the second audio content, an option may also be provided for switching the playback of the second audio content in audition mode to a regular mode. In this case, playback devices playing the first audio content may switch to playing the second audio content in synchrony with the playback of the second audio content by the at least one playback device, previously in audition mode.

Based on the discussions above, one of ordinary skill in the art may also appreciate that audition playback modes may be implemented and utilized with flexibility. For example, additional audio content may be added to the first audio content (original playback queue) and/or the second audio content (audition playback queue) while in audition mode. In other words, audio content, such as the second audio content (either the entire audition playback queue or files in the audition playback queue) or other audio content may be added to the original playback queue while the second audio content is being rendered audition mode. Similarly, additional audio content may be added to the second audio content (audition playback queue) while the second audio content is being rendered in audition mode.

VII. Example Configurations of Audition Mode

As discussed above, FIG. 7 provides an example method 700 for providing audio content auditioning. To further illustrate features of audition mode and implementations of the method 700, audio playback configurations when entering and exiting audition mode are discussed in further detail below.

A. Audio Playback Configurations when Entering Audition Mode

In the example system, audition mode may be requested when audio content is already playing on zone players in one or more zones or zone groups in the system. In one case, the audio that is currently playing in the system may continue to play without effect. This may occur, for example, if audition mode is playing content on a controller that was not already being used for playback. This may also occur, for example, if audition mode is used in a zone that was not currently playing audio content, even though other zones in the system may have been playing audio content. For instance, if audio content is currently being played in the "Living Room" zone and the "Family Room" zone, but not in the "Den" zone, then audition mode can be requested in the "Den" zone without any effect on the audio content playback in the "Living Room" zone and the "Family Room" zone.

In another case, the audio content that is currently playing in the system may be paused while the new audition audio content is played in audition mode. This may occur, for example, if the audition mode has been requested for a (single or grouped) zone that is currently playing audio content that may be paused or stopped, and resumed or restarted. In yet another case, the audio content that is currently playing in the system may be effectively muted while the new audio content is played in audition mode. This may occur, for example, if audition mode has been requested for a (single or grouped) listening zone play that is currently playing audio content that cannot be paused or stopped, and resumed or restarted. This may also occur, for example, when zone players in a zone of the grouped zones plays the audition audio content in audition mode while zone players in the remaining zones of the grouped zones continue to play audio content in regular playback mode. In this example, continuing to stream the audio in regular playback mode to the zone that is playing back audition audio content in audition mode, even though the audio stream will not be played while the zone is in audition mode, may have the advantage that the zone can quickly rejoin the grouped zones in audio synchrony after audition mode is exited or terminated. As such, it can be appreciated that in some cases, multiple "auditions" may occur at the same time in different zones or zone groups in a system.

Figure 8A:
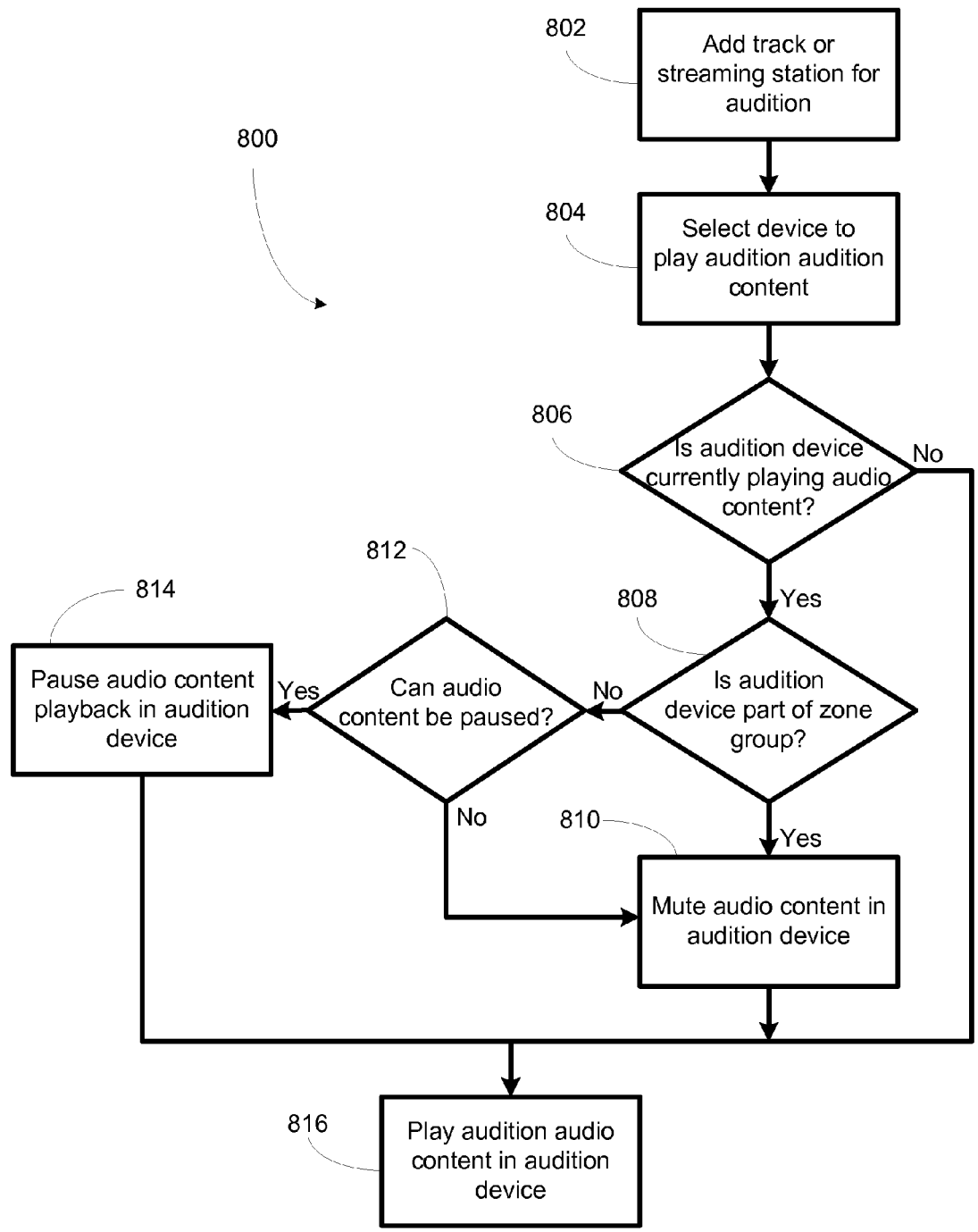
FIG. 8A shows an illustrative example flow chart for beginning audio content auditioning.

To further illustrate configuring audio playing while using audition mode, FIG. 8A shows an illustrative example flow chart 800 for beginning audio content auditioning. As shown, the flow chart block diagram includes action blocks 802, 804, 810, 814, and 816, and determination blocks 806, 808, and 812.

At action block 802, audition audio content may be selected and added to be auditioned. As discussed above, the audition audio content may be an indexed track or an audio stream from a variety of audio sources. At action block 804, a playback device, such as a zone player, or a group of zone players in a listening zone or zone group may be selected for playing the audition audio content in audition mode. At determination block 806, a determination is made as to whether the playback device selected at action block 804 is already playing audio content, such as music. If the selected playback device is not currently playing audio content, then the system proceeds to action block 816 to play the audition audio content with the selected playback device.

If the selected playback device is in fact currently playing audio content, the system proceeds to determination block 808 to determine whether the selected playback device is part of a zone group. At determination block 808, if the selected playback device is part of a zone group, the system may proceed to action block 810 to mute the audio content already playing before proceeding to action block 816 to play the audition audio content with the selected playback device. If the determination at block 808 is that the selected playback device is not part of a zone group, the system may proceed to determination block 812 to determine whether the audio content already being played by the selected playback device can be paused. As discussed above, if audio content that cannot be paused (audio streaming from the internet, for example), but can be buffered, the audio content may effectively be considered audio content that can be paused.

At determination block 812, if the audio content already playing can be paused, the system may proceed to action block 814 to pause the audio content that is already playing before proceeding to action block 816 to play the audition audio content with the selected playback device. On the other hand, if the determination at block 812 is that the audio content already playing cannot be paused, the system may proceed to action block 810 to mute the audio content that is already playing before proceeding to action block 816 to play the audition audio content with the selected playback device.

B. Audio Playback Configurations when Exiting Audition Mode

As previously described, when the example system exits audition mode, the system may return the system to the state the system was in before entering audition mode. In one example, the audio content that was paused when entering audition mode may be restarted for playback. In another example, the audio content that was muted when entering audition mode may be unmuted and played at its original volume level. In both examples, a seamless transition back to regular playback mode after audition mode is exited or terminated may be provided.

Figure 8B:
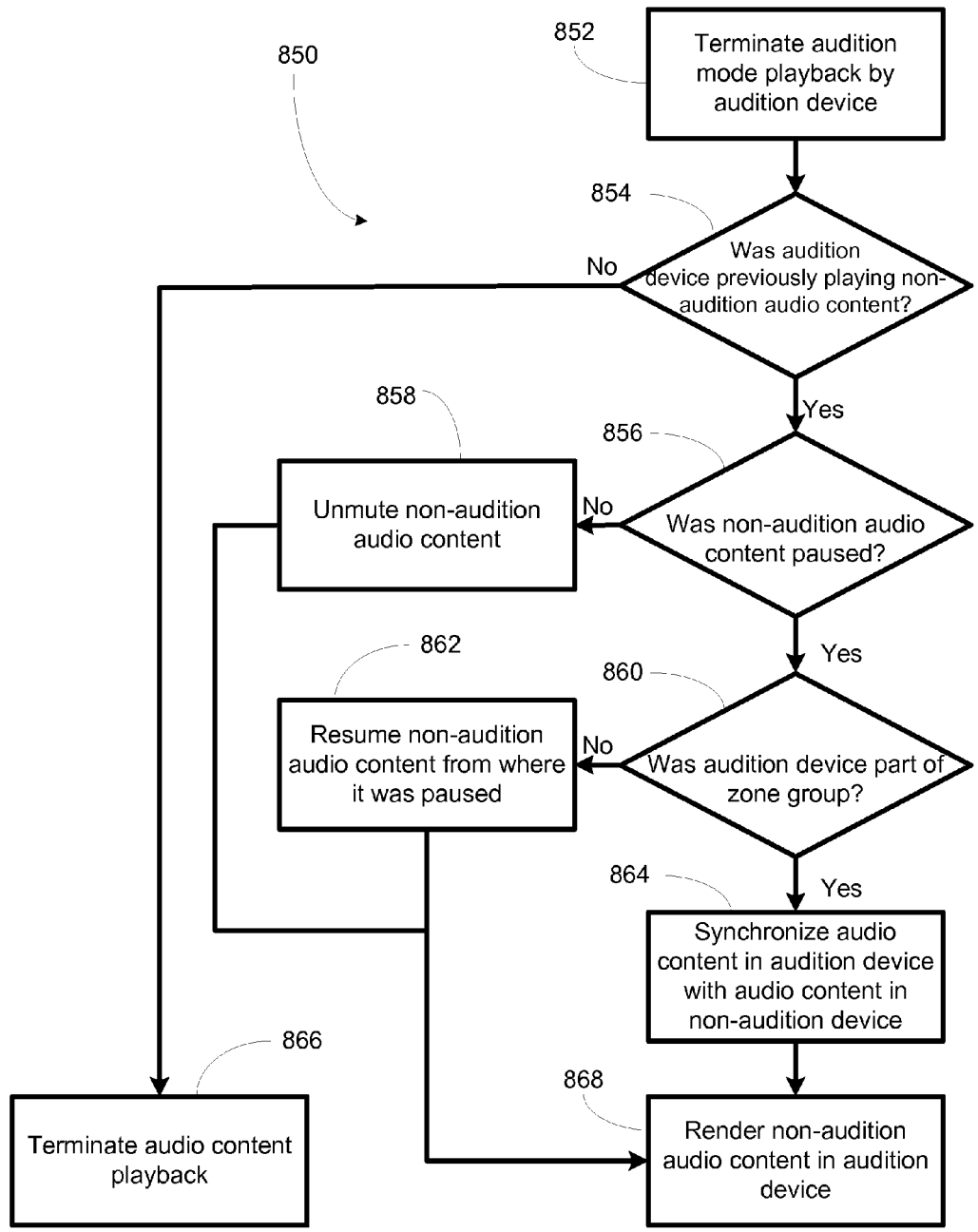
FIG. 8B shows an illustrative example flow chart for terminating audio content auditioning.

FIG. 8B shows an illustrative example flow chart for terminating audio content auditioning or exiting audition mode. As shown, the flow chart block diagram includes action blocks 852, 858, 862, 864, 866, and 868, and determination blocks 854, 856, and 860.

At action block 852, audition mode playback of the audition audio content is terminated. In one example, audition mode may be exited or terminated upon completion of the audition audio content, expiration of the predetermined duration of time for audition mode, or in response to a request from the user to terminate or exit audition mode.

At determination block 854, determination is made as to whether the audition mode playback device was previously playing audio content prior to entering audition mode. If the playback device is determined to not have been previously playing audio content prior to entering audition mode, the system may simply proceed to action block 866 of terminating audio content playback by the system or specific playback device.

If, at determination block 854, the playback device is determined to have been previously playing audio content, the system may proceed to determination block 856 to determine whether the previously played audio content was paused when the system entered audition mode. If the previously played audio content is determined to not have been paused, the system may proceed to action block 858 to unmute the previously played audio content before proceeding to action block 868 to continue to cause the audition mode playback device to render the previously played audio content. Naturally, in this case, the system was configured to suspend audio content playback by either pausing or muting the previously played audio content.

If, at determination block 856, the playback device is determined to have been paused, the system may then proceed to determination block 860 to determine whether the audition mode playback device was part of a zone player group. If the determination at determination block 860 indicates that the audition mode playback device was not part of a zone player group, then the system may proceed to action block 862 to resume the previously played audio content from where it was paused before proceeding to action block 868 to continue to cause the audition mode playback device to render the previously played audio content.

On the other hand, if the determination at determination block 860 indicates that the audition mode playback device was in fact part of a zone player group, the system may proceed to action block 864 to synchronize the previously played audio content by the audition mode playback device with the audio content played by the other zone players in the zone player group before proceeding to action block 868 to continue to cause the audition mode playback device to render the previously played audio content.

In one example, the synchronization may be performed such that the audio content played by the other zone players in the zone player group is rewound to be in synchrony with the paused audio content previously played by the audition mode playback device. In another example, the synchronization may be performed such that the paused audio content previously played by the audition mode playback device is fast forwarded to by in synchrony with the audio content played by the other zone players in the zone player group, which continued to render the previously played audio content while the audio mode playback device was in audition mode.

While in audition mode, the example system may be configured such that the user may request via the controller interface audio content to be added to the regular mode playback queue upon exiting audition mode. In one example, the user may select using the interface on the controller, audio content currently playing in audition mode to be added to the regular playback queue upon exiting audition mode. In another example, the user may create using the interface on the controller a new audition playback queue of audio content in audition mode, such that the audition playback queue may be combined with the regular playback queue upon exiting audition mode. The audio content of the audition queue may be combined with the regular playback queue in many ways. For instance, audition audio content from the audition playback queue may be added at the beginning of the regular playback queue, at the end of the regular playback queue, inserted at random within the regular playback queue, or even replace the regular playback queue altogether, as shown above in Table 4.

In some cases, the audio content may be added to the regular playback queue at the beginning of the regular playback queue during audition mode playback such that the added audio content continues to play without interruption in the regular playback queue, even upon exiting the audition mode. In other words, the example system may be configured such that the user may request the complete playback of music or audio content in audition mode, before exiting audition mode, and without adding the music or audio content to the playback queue. Such configurations may be applicable if the audition mode playback involves rendering streaming audio content.

VIII. Conclusion

As discussed above, systems and methods are provided to offer a unique wired, wireless, or both wired and wireless audio solution that allows audio content to be played in a single listening zone or across multiple listening zones simultaneously and in synchrony.

In one example, a method is provided that comprises providing a first audio content to be rendered by a first group of one or more playback devices, receiving input data indicating a request for a second audio content to be played for a duration of time by at least one playback device from the first group of one or more playback devices, suspending rendering of the first audio content by the at least one playback device, providing the second audio content to be rendered by the at least one playback device for the duration of time, and resuming rendering of the first audio content by the at least one playback device.

In another example, a device is provided. The device includes a processor and memory. The memory includes instructions stored therein executable by the processor to perform functions. The performed functions comprise providing a first audio content to be rendered by a first group of one or more playback devices, receiving input data indicating a request for a second audio content to be played for a duration of time by at least one playback device from the first group of one or more playback devices, suspending rendering of the first audio content by the at least one playback device, providing the second audio content to be rendered by the at least one playback device for the duration of time, and resuming rendering of the first audio content by the at least one playback device.

In yet another example, a system is provided. The system includes one or more audio content sources, one or more audio playback devices, a controller, and a processing unit in communication with the audio content source, the one or more audio playback device, and the controller. The processing unit is configured to cause a first group of one or more playback devices to render a first audio content from the one or more audio content sources. The processing unit is further configured to receive from the controller input data indicating a request for a second audio content from the one or more audio content sources to be played for a duration of time by at least one playback device from the first group of one or more playback devices, cause one or more of the playback devices from the first group of one or more playback devices to suspend rendering of the first audio content, cause the at least one playback device to render the second audio content for the duration of time, and cause the one or more of the playback devices from the first group of one or more playback devices to resume rendering of the first audio content.

The description discloses various example systems, methods, apparatus, and articles of manufacture including, among other components, firmware and/or software executed on hardware. However, such examples are merely illustrative and should not be considered as limiting. For example, it is contemplated that any or all of these firmware, hardware, and/or software components could be embodied exclusively in hardware, exclusively in software, exclusively in firmware, or in any combination of hardware, software, and/or firmware. Accordingly, while the following describes example systems, methods, apparatus, and/or articles of manufacture, the examples provided are not the only way(s) to implement such systems, methods, apparatus, and/or articles of manufacture.

Additionally, reference herein to "embodiment" means that a particular feature, structure, or characteristic described in connection with the embodiment can be included in at least one example embodiment of the invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible medium such as a memory, DVD, CD, Blu-ray, and so on, storing the software and/or firmware.

We claim:

1. A method comprising:
    playing, by a first playback device, first audio content in synchrony with at least one second playback device;
    receiving, by the first playback device, one or more commands that define a duration of time;
    stopping, by the first playback device, playback of the first audio content based on the received one or more commands;
    after stopping playback of the first audio content, playing, by the first playback device, second audio content for the duration of time defined by the one or more commands; and
    after playing the second audio content for the duration of time, resuming, by the first playback device, playback of the first audio content in synchrony with the at least one second playback device.

2. The method of claim 1, wherein the duration of time is a predefined duration of time, and wherein playing the second audio content comprises playing the second audio content for the predefined duration of time based on the received one or more commands.

3. The method of claim 1, wherein playing the second audio content comprises playing the second audio content in synchrony with the at least one second playback device.

4. The method of claim 1, wherein playing the second audio content comprises playing the second audio content in synchrony with a third playback device.

5. The method of claim 1, wherein the second audio content is an audio track; wherein the duration of time is less than a full length of the audio track; and wherein playing the second audio content comprises playing the second audio content for the less than the full length of the audio track.

6. The method of claim 1, wherein resuming playback of the first audio content in synchrony with the at least one second playback device comprises resuming playback of the first audio content in synchrony with a third playback device.

7. The method of claim 1, wherein resuming playback of the first audio content in synchrony with the at least one second playback device comprises resuming playback of the first audio content at a position within the first audio content at which the first playback device stopped playback of the first audio content.

8. The method of claim 1, wherein resuming playback of the first audio content in synchrony with the at least one second playback device comprises resuming playback of the first audio content at a given position within the first audio content, wherein the given position comprises a position within the first audio content that the at least one second playback device reached in playback of the first audio content as the first playback device played back the second audio content.

9. A method comprising:
    playing, by a first playback device, first audio content in synchrony with at least one second playback device;
    receiving, by the first playback device, one or more commands that define a duration of time;
    stopping, by the first playback device, playback of the first audio content based on the received one or more commands;

after stopping playback of the first audio content, playing, by the first playback device, second audio content for the duration of time defined by the received one or more commands; and after playing the second audio content for the duration of time defined by the one or more commands, playing, by the first playback device, the second audio content in synchrony with the at least one second playback device.

10. The method of claim 9, wherein the duration of time is a predefined duration of time, and wherein playing the second audio content for the duration of time defined by the received one or more commands comprises playing the second audio content for the predefined duration defined by the received one or more commands.

11. The method of claim 9, wherein the first audio content and the second audio content are received by the first playback device from different sources.

12. The method of claim 9, wherein playing the second audio content in synchrony with the at least one second playback device comprises playing the second audio content in synchrony with a third playback device.

13. The method of claim 9, wherein the second audio content is an audio track; wherein the duration of time is less than a full length of the audio track; and wherein playing the second audio content for the duration of time defined by the received one or more commands comprises playing the second audio content for less than the full length of the audio track.

14. The method of claim 9, wherein the first playback device is a control device configured to control the at least one second playback device.

15. A non-transitory computer-readable medium having stored thereon program instructions executable by a processor to perform a method comprising:

playing, by a first playback device, first audio content in synchrony with at least one second playback device;

receiving, by the first playback device, one or more commands that define a duration of time;

stopping, by the first playback device, playback of the first audio content based on the received one or more commands;

after stopping playback of the first audio content, playing, by the first playback device, second audio content for the duration of time defined by the received one or more commands; and after playing back the second audio content for the duration of time defined by the one or more commands, playing, by the first playback device, the second audio content in synchrony with the at least one second playback device.

16. The non-transitory computer-readable medium of claim 15, wherein the duration of time is a predefined duration of time, and wherein playing the second audio content for the duration of time defined by the received one or more commands comprises playing the second audio content for the predefined duration defined by the received one or more commands.

17. The non-transitory computer-readable medium of claim 15, wherein the first playback device is a control device configured to control the at least one second playback device.

18. The non-transitory computer-readable medium of claim 15, wherein playing the second audio content in synchrony with the at least one second playback device comprises playing the second audio content in synchrony with a third playback device.

19. The non-transitory computer-readable medium of claim 15, wherein the second audio content is an audio track; wherein the duration of time is less than a full length of the audio track; and wherein playing the second audio content for the duration of time defined by the received one or more commands comprises playing the second audio content for less than the full length of the audio track.

20. The non-transitory computer-readable medium of claim 15, wherein the first audio content and the second audio content are received by the first playback device from different sources.

* * * * *